US008985086B2

(12) United States Patent
Shishime et al.

(10) Patent No.: US 8,985,086 B2
(45) Date of Patent: Mar. 24, 2015

(54) METHOD AND DEVICE FOR CONTROLLING SPARK-IGNITION DIRECT INJECTION ENGINE

(75) Inventors: Kouji Shishime, Hiroshima (JP); Junsou Sasaki, Hiroshima (JP); Hideki Omori, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 696 days.

(21) Appl. No.: 13/284,352

(22) Filed: Oct. 28, 2011

(65) Prior Publication Data

US 2012/0111302 A1 May 10, 2012

(30) Foreign Application Priority Data

Nov. 9, 2010 (JP) ................................ 2010-251073

(51) Int. Cl.
| F02B 3/00 | (2006.01) |
| F02D 41/40 | (2006.01) |
| F02P 5/15 | (2006.01) |
| F02P 5/152 | (2006.01) |

(52) U.S. Cl.
CPC ............. *F02D 41/405* (2013.01); *F02P 5/1514* (2013.01); *F02P 5/152* (2013.01); *Y02T 10/46* (2013.01); *Y02T 10/44* (2013.01)
USPC .......................................... 123/299; 123/305

(58) Field of Classification Search
CPC ........... F02D 2041/001; F02D 41/402; F02D 41/401; F02D 13/0265; Y02T 10/44; Y02T 10/42; Y02T 10/18; F02B 1/12
USPC .............. 123/435, 436, 299, 90.15, 345–348, 123/406.24, 406.29, 406.34, 406.35, 123/406.55, 295, 305, 457; 701/104
See application file for complete search history.

(56) References Cited

U.S. PATENT DOCUMENTS

| 3,557,765 | A | * | 1/1971 | Nystrom | 123/387 |
| 5,950,419 | A | * | 9/1999 | Nishimura et al. | 60/274 |
| 6,880,519 | B2 | * | 4/2005 | Nakayama et al. | 123/295 |
| 7,222,602 | B2 | * | 5/2007 | Fukasawa | 123/299 |
| 7,866,303 | B2 | * | 1/2011 | Storhok et al. | 123/491 |
| 8,434,450 | B2 | * | 5/2013 | Durrett | 123/299 |
| 8,544,444 | B2 | * | 10/2013 | Hitomi et al. | 123/294 |

(Continued)

FOREIGN PATENT DOCUMENTS

JP        2010-101312 A    5/2010

*Primary Examiner* — Lindsay Low
*Assistant Examiner* — Gonzalo Laguarda
(74) *Attorney, Agent, or Firm* — Alleman Hall McCoy Russell & Tuttle LLP

(57) ABSTRACT

A method for controlling an engine includes, when the engine is operating within a particular range with comparatively low engine speed and high load, setting an effective compression ratio of 10:1 or above, retarding ignition timing by a predetermined amount and retarding the ignition timing within a first, relatively low engine speed range more than within a second, higher engine speed range, setting an injection mode of an injection valve to divided injections performed at least twice in a period from an intake stroke to an earlier-half stage of a compression stroke, performing, within the first engine speed range, a final injection in the earlier-half stage of the compression stroke, and performing, within the second engine speed range, the final injection in a late stage of the intake stroke and at least one injection other than the final injection in a middle stage of the intake stroke.

17 Claims, 9 Drawing Sheets

(56) References Cited

U.S. PATENT DOCUMENTS

| | | |
|---|---|---|
| 8,655,572 B2* | 2/2014 | Iwai et al. ............. 701/104 |
| 8,706,382 B2* | 4/2014 | Oba et al. ............. 701/104 |
| 2010/0077990 A1* | 4/2010 | Shishime et al. ............. 123/299 |
| 2010/0242899 A1* | 9/2010 | Hitomi et al. ............. 123/299 |
| 2012/0216776 A1* | 8/2012 | Nagatsu et al. ............. 123/305 |
| 2013/0218441 A1* | 8/2013 | Thomas et al. ............. 701/105 |
| 2014/0060489 A1* | 3/2014 | Iwai et al. ............. 123/478 |
| 2014/0074378 A1* | 3/2014 | Iwai et al. ............. 701/104 |

* cited by examiner

METHOD AND DEVICE FOR CONTROLLING SPARK-IGNITION DIRECT INJECTION ENGINE

BACKGROUND

The present invention relates to a method and device for controlling a spark-ignition direct injection engine.

In order to increase a heat efficiency of an engine to improve fuel consumption, it is effective to increase a compression ratio. However, with a spark-ignition engine using gasoline or a fuel containing gasoline, if a compression ratio is high in which a geometric compression ratio is above 12:1, within an operating range where an engine speed is comparatively low and an engine load is high, abnormal combustion such as knocking and pre-ignition (hereinafter, the abnormal combustion is represented by "knocking") are easily caused. As one of measure to suppress such knocking, retarding an ignition timing greatly may be proposed.

For example, JP2010-101312A discloses a control in a spark-ignition direct injection engine with a high compression ratio, which suppresses an occurrence of knocking within a low speed range where the engine load is high, where knocking easily occurs, by performing divided injections in which an injection of a small amount of fuel is performed in an intake stroke and an injection of a large amount of fuel is performed in a late stage of compression stroke, in addition to greatly retarding an ignition timing to after top dead center on the compression stroke.

However, although the suppression of knocking can be expected with the above control, a sufficient torque cannot be secured therewith. That is, although a high compression ratio engine has a potential of having an increased torque, a sufficient torque has not conventionally been achieved due to countermeasures against knocking.

SUMMARY

The present invention is made in view of the above situations, and achieves an increased torque with a high compression ratio engine within a particular operating range where the engine speed is comparatively low and the load is high, while effectively suppressing knocking.

The present invention improves, within a range where the engine speed is relatively low within the particular operating range where knocking easily occurs, an anti-knock performance by cooling a gas inside a cylinder and increases torque by increasing an advancing amount of an ignition timing, and increases, within a range of the particular operating range where the engine speed is relatively high, the torque while avoiding knocking by improving an intake air charging efficiency.

According to one aspect of the present invention, a method of controlling a spark-ignition direct injection engine is provided. The method includes, when an operating state of an engine body having a cylinder in which a geometric compression ratio is set to 12:1 or above is within a particular operating range where an engine speed is comparatively low and a load is high, setting an effective compression ratio to be 10:1 or above, retarding an ignition timing for a gas mixture inside the cylinder by a predetermined amount with respect to an MBT (Minimum advance for Best Torque) within the particular operating range, and setting a retarding amount of the ignition timing within a first engine speed range of the particular operating range, where the engine speed (number of rotations) is relatively low, to be larger than a retarding amount of the ignition timing within a second engine speed range where the engine speed is higher than the first engine speed range, setting an injection mode of a fuel injection valve for directly injecting fuel into the cylinder to divided injections in which the injection is performed at least twice in a period from an intake stroke to an earlier-half stage of a compression stroke within the particular operating range, performing, within the first engine speed range of the particular operating range, the final injection of the divided injections in the earlier-half stage of the compression stroke, and performing, within the second engine speed range of the particular operating range, the final injection of the divided injections in a late stage of the intake stroke and at least one injection other than the final injection in a middle stage of the intake stroke.

Here, the phrase "a load is high" may be defined as a load higher than a predetermined load, for example, a full load. Further, the phrase "where an engine speed is comparatively low" may be defined as an engine speed on a lower engine speed side in a case where the engine speed range is divided into the lower engine speed side and a higher engine speed range, and, for example, may also mean an engine speed within a range including at least a part of lower and middle speed ranges in a case where the engine speed range is divided into three: lower, middle and higher engine speed ranges. Within the particular operating range where the engine speed is low and the load is high, the first engine speed range where the engine speed is relatively low may substantially correspond to the lower engine speed range, and the second engine speed range where the engine speed is relatively high may substantially correspond to the middle speed range. The particular operating range may be defined as, by using other words, an operating range where an abnormal combustion including knocking and pre-ignition easily occurs, in the engine body with high compression ratio of which the geometric compression ratio is set to be 12:1 or above.

Further, the phrase "an earlier-half stage of a compression stroke" may be defined as an earlier-half stage in a case where the compression stroke is divided into two: the earlier-half and later-half stages. Further, the phrase "a late stage of an intake stroke" may be defined as a late stage in a case where the compression stroke is divided into three: early, middle and late stages, and similarly, the phrase "middle stage of the intake stroke" may be defined as a middle stage in the case where the intake stroke is divided into the three: the early, middle and late stages. Note that, the intake stroke and the compression stroke are not limited to be defined by only a position of a piston (a crank angle) for reciprocating inside the cylinder. For example, the end of the intake stroke may not be when the piston reaches an intake top dead center, and may be, while an intake valve is opened and intake into the cylinder substantially continues even after the piston reaches the intake top dead center (while the engine speed is comparatively high and the reverse flow is not caused even after the piston passes the intake top dead center), substantially included in the late stage of the intake stroke.

In the above configuration, when the engine body is within the particular operating range, in other words, within an operation range where knocking easily occurs, the effective compression ratio is set to 10:1 or above. The effective compression ratio of 10:1 or above can achieve both an improvement in anti-knock performance and an increase in torque.

Further, within the particular operating range, the ignition timing for a gas mixture inside the cylinder is retarded with respect to the MBT by the predetermined amount to suppress knocking. Here, within the first engine speed where the engine speed is relatively low, knocking easily occurs compared to the second engine speed range where the engine speed is relatively high, thus, the retarding amount of the fuel ignition timing is set to be larger. Thereby, knocking can effectively be suppressed within the first engine speed range and the second engine speed range.

Within the particular operating range, the injection mode of the fuel into the cylinder is set to inject in divided injections in which the injection is performed at least twice in the period from the intake stroke to the earlier-half stage of the compression stroke. Moreover, within the first engine speed range, the final injection of the divided injections is performed in the earlier-half stage of the compression stroke. The fuel directly injected into the cylinder on the compression stroke contributes in decreasing the temperature of the gas inside the cylinder by a latent heat caused through the vaporization of the fuel and is advantageous in decreasing the temperature inside the cylinder before the ignition (suppressing a temperature rising). Thereby, knocking can be suppressed, thus the antiknock performance is improved, and the retarding amount of the ignition timing can correspondingly be reduced. That is, the torque can be increased corresponding to an advancing amount of the ignition timing while avoiding the occurrence of knocking. Further, the fuel injected before the final injection is injected before the earlier-half stage of the compression stroke, thereby, a sufficient vaporization time can be secured until the ignition timing.

Meanwhile, within the second engine speed range, unlike the first engine speed range, the final injection of the divided injections is performed in the late stage of the intake stroke and at least one injection other than the final injection is performed in the middle stage of the intake stroke. The fuel injected into the cylinder in the late stage of the intake stroke cools the intake air with the latent heat caused by the vaporization of the fuel, thus an intake air charging efficiency is effectively improved. This can be advantageous in increasing the torque. On the other hand, because the middle stage of the intake stroke is a period for the intake air flow velocity to be the fastest, the fuel injection into the cylinder in the middle stage of the intake stroke can improve the mixing performance of the fuel. This is advantageous in improving the anti-knock performance by suppressing the variation level of the concentration of the fuel inside the cylinder and also in improving the anti-knock performance by shortening the combustion period. As a result thereof, the ignition timing can be advanced.

Therefore, within the first engine speed range where the engine speed is relatively low, due to enhancing the gas cooling inside the cylinder by performing the final fuel injection of the divided injections in the earlier-half stage of the compression stroke, the anti-knock performance is improved and the ignition timing can be advanced, therefore, the occurrence of knocking can be avoided and the torque can be increased. Meanwhile, within the second engine speed range where the engine speed is relatively high, by performing the fuel injection that is divided into two injections in the middle stage and the late stage of the intake stroke, the torque can be increased by improving the intake air charging efficiency due to enhancing the intake air cooling, while improving the anti-knock performance.

Here, a relation between the ignition timing and the torque is considered. That is, the ignition timing and the torque are in the relation in which an increase of the torque for a predetermined advancing amount of the ignition timing with respect to the MBT (e.g., for the advancing amount of 1° C.A) is larger as the retarding amount of the ignition timing is larger, and the increase of the torque for the predetermined advancing amount of the ignition timing is smaller as the retarding amount of the ignition timing is smaller. Within the first engine speed range where the engine speed is relatively low, because knocking comparatively easily occurs, the retarding amount of the ignition timing is originally set to be large, on the other hand, within the second engine speed range where the engine speed is relatively high, the retarding amount of the ignition timing is set to be relatively small. Therefore, within the first engine speed range, the effect of the torque up by advancing the ignition timing is high.

Moreover, within the first engine speed range where knocking easily occurs compared to the second engine speed range, even if the intake air charging amount is to be increased to increase the torque, the pressure inside the cylinder increases corresponding to the increase of the intake air charging amount and the anti-knock performance may degrade. Thereby, the ignition timing may further be retarded, and as a result, the torque may not be increased corresponding to the increased intake air charging amount.

Therefore, as described above, within the first engine speed range, decreasing the temperature of the gas inside the cylinder as much as possible to improve the anti-knock performance, and thereby, advancing the ignition timing as much as possible can be advantageous in increasing the torque. On the other hand, within the second engine speed range, because the increasing level of the torque is small even if the ignition timing is advanced by improving the anti-knocking performance, improving the intake air charging efficiency can be advantageous in increasing the torque.

When a temperature of the engine body is above a predetermined value, the final injection of the divided injections within the first engine speed range may be performed in the earlier-half stage of the compression stroke, and when the temperature of the engine body is below the predetermined value, the final injection may be performed in the late stage of the intake stroke.

When the temperature of the engine body is below the predetermined value, for example, in a cold state of the engine, the temperature inside the cylinder is decreased and this is advantageous in suppressing knocking. Therefore, in the state where the temperature of the engine body is below the predetermined value and is advantageous in suppressing knocking, by performing the final injection in the late stage of the intake stroke, the intake charging efficiency is improved and the torque is increased. On the other hand, in a state where the temperature of the engine body is above the predetermined value and is disadvantageous in suppressing knocking, for example in a warmed-up state of the engine, it is preferable that the last injection of fuel injections is performed in the earlier-half stage of the compression stroke, and thereby, the gas cooling inside the cylinder is enhanced to improve the anti-knock performance and the torque is increased by advancing the ignition timing.

The method may further include setting, when the operating state of the engine body is within the particular operating range, a closing timing of an intake valve of the cylinder to be the earlier-half stage of the compression stroke. When the temperature of the engine body increases from below the predetermined value to above the predetermined value, the timing of the final injection within the first engine speed range may be changed from the late stage of the intake stroke to after the intake valve is closed in the earlier-half stage of the compression stroke.

As described above, when the temperature of the engine body is below the predetermined value, for example, in the cold state of the engine, by performing the final injection in the late stage of the intake stroke, the intake air charging efficiency can be improved and the torque is increased. And after that, when the engine is warmed up and the temperature of the engine body exceeds the predetermined value, the state changes from advantageous in suppressing knocking to disadvantageous in suppressing knocking, therefore, the final injection timing is changed to be in the earlier-half stage of the compression stroke. Thereby, the anti-knock performance is improved by enhancing the cooling of gas inside the cylinder and the ignition timing is advanced to increase the torque. Here, by performing the final injection after closing the intake valve, the reverse flow of the fuel to an intake port can be prevented. This is advantageous in surely sealing the injected fuel inside the cylinder and sufficiently cooling the gas inside the cylinder by a latent heat caused thereby, and as a result, the ignition timing is advanced as much as possible and the torque can effectively be increased.

Here, "when the intake valve is closed" may be defined to be not limited to a state where the intake valve is actually closed, and also include a state where the intake valve is substantially closed. Specifically, although it is not limited to this, 0.3 mm of valve lift amount point may be defined as when the intake valve is closed.

When an intake air temperature of the engine body is above a predetermined value, the final injection within the first engine speed range may be set to be in the earlier-half stage of the compression stroke, and when the intake air temperature is below the predetermined value, the final injection may be performed in the late stage of the intake stroke.

Similar to the temperature of the engine body described above, when the intake air temperature is below the predetermined value, because the gas temperature inside the cylinder is decreased and this is advantageous in suppressing knocking, the final injection is performed in the late stage of the intake stroke. Thereby, the intake air charging efficiency is improved and the torque is increased. On the other hand, in a state that is disadvantageous in suppressing knocking, such as the state where the intake air temperature is above the predetermined value, by performing the final injection in the earlier-half stage of the compression stroke, the anti-knock performance is improved by enhancing the cooling of the gas inside the cylinder and the ignition timing is advanced to increase the torque.

When the operating state of the engine body is within the first engine speed range, the injection mode of the fuel injection valve may be set to the divided injections in which two injections of a first injection that is performed on the intake stroke and a second injection that is performed in the earlier-half stage of the compression stroke are performed, when the operating state of the engine body is within the second engine speed range, the injection mode of the fuel injection valve may be set to the divided injections in which two injections of a first injection that is performed in the middle stage of the intake stroke and a second injection that is performed in the late stage of the intake stroke are performed, and when the engine speed is relatively high, a ratio of a first injection amount with respect to the total injection amount may be set higher than when the engine speed is relatively low.

The first fuel injection is an injection performed on the intake stroke and can contribute in improving the mixing performance of the fuel by an intake flow, and improving the intake air charging efficiency by the intake air cooling. When the engine speed is relatively high, because the intake flow is relatively high, by setting the ratio of the first injection amount with respect to the total injection amount higher than when the engine speed is relatively low, the mixing performance and the intake air charging efficiency can effectively be improved by using the high intake flow. That is, it is advantageous in achieving both the avoiding of knocking and the improvement in torque in a higher dimension. Note that, the phrase "when the engine speed is relatively high, a ratio of a first injection amount with respect to the total injection amount may be set higher than when the engine speed is relatively low" includes increasing the first injection amount with respect to the total injection amount within the second engine speed range to be higher than that for the first engine speed range.

When the operating state of the engine body is within the particular operating range, the injection mode of the fuel injection valve may be set to the divided injections in which two injections of a first injection and a second injection are performed, the first injection may be performed on the intake stroke when the second injection is performed in the earlier-half stage of the compression stroke, and may be performed in the middle stage of the intake stroke when the second injection is performed in the late stage of the intake stroke, and when a timing of the second injection is set to be in the late stage of the intake stroke, a ratio of a second injection amount with respect to the total injection amount may be set lower than when the ignition timing of the second injection is set to be in the earlier-half stage of the compression stroke.

When the ignition timing of the second fuel injection is set to be in the late stage of the intake stroke, because knocking is less likely to occur and it is in the state that is relatively advantageous in suppressing knocking, thereby, the ratio of the second fuel injection with respect to the total injection amount is set to be comparatively low. Because the ratio of the second injection amount is set to be low, the ratio of the first injection amount that is injected in the middle stage of the intake stroke is increased corresponding to the lowered ratio of the second injection amount, as described above, it is advantageous in improving the mixing performance of the fuel by the intake air flow and the intake air charging efficiency by the intake air cooling, and then, the torque can effectively be increased in the state that is relatively advantageous in suppressing knocking.

On the other hand, when the ignition timing of the second injection is set to be in the earlier-half stage of the compression stroke, knocking easily occurs and the state is relatively disadvantageous in suppressing knocking. Therefore, through setting the ratio of the second injection amount with respect to the total injection amount as comparatively high and setting a priority in cooling the gas inside the cylinder to improve the anti-knock performance and, as a result, advance the ignition timing as much as possible, the torque can be increased.

The ignition timing may be set to be during an expansion stroke after a top dead center on the compression stroke for the first engine speed range, and may be set to be during the compression stroke before the top dead center on the compression stroke for the second engine speed range.

As described above, the first engine speed range where the engine speed is relatively low is disadvantageous in suppressing knocking compared to the second engine speed range. Thus, it is preferable in avoiding knocking that the ignition timing within the first engine speed range is more retarded than the ignition timing within the second engine speed range.

The method may further include setting a pressure of the fuel to be supplied to the fuel injection valve higher as the engine speed increases. Increasing the pressure of the fuel can shorten the pulse width relating to the fuel injection from the fuel injection valve, and thereby, when the engine speed is comparatively high and causes the increase of the fuel injection amount, it is advantageous in improving flexibility in setting each of the injection timings of the injections of the divided injections. This is, in particular, advantageous within the second engine speed range where the speed of the engine body is relatively high and the actual time for a crank angle duration is short, as well as when the divided injections are performed at least in the middle and late stages of the intake stroke.

According to another aspect of the invention, a control device of a spark-ignition direct injection engine is provided. The control device includes an engine body having a cylinder in which a geometric compression ratio is set to 12:1 or above, a fuel injection valve for directly injecting fuel into the cylinder at a predetermined injection timing, an ignition plug for spark-igniting a gas mixture inside the cylinder at a predetermined ignition timing, a compression ratio adjusting mechanism for adjusting an effective compression ratio of the engine body by changing activation modes of intake and exhaust valves for performing intake and exhaust for the cylinder, where the activation mode includes at least opening and closing timings of the intake and exhaust valves, and a controller for controlling an operation of the engine body through controlling the fuel injection valve, the ignition plug, and the compression ratio adjusting mechanism.

Further, when an operating state of the engine body is within a particular operating range where an engine speed is comparatively low and a load is high, the control by the controller includes setting the effective compression ratio to be 10:1 or above, retarding the ignition timing with respect to an MBT, and setting a retarding amount of the ignition timing within a first engine speed range of the particular operating range, where the engine speed is relatively low, to be larger than a retarding amount of the ignition timing within a second engine speed range where the engine speed is higher than the first engine speed range, setting an injection mode of the fuel to divided injections in which the injection is performed at least twice in a period from an intake stroke to an earlier-half stage of a compression stroke, performing, within the first engine speed range, the final injection of the divided injections in the earlier-half stage of the compression stroke, and performing, within the second engine speed range, the final injection of the divided injections in a late stage of the intake stroke and the at least one injection other than the final injection in a middle stage of the intake stroke.

The control device may further include a first detector for detecting a temperature parameter relating to a temperature of the engine body. Based on a detection result by the first detector, the controller may set a final injection timing of the divided injections within the first engine speed range to be in the earlier-half stage of the compression stroke when the temperature of the engine body is above a predetermined value and to be in the late stage of the intake stroke when the temperature of the engine body is below the predetermined value.

The controller may set, when the operating state of the engine body is within the particular operating range, the closing timing of the intake valve to be the earlier-half stage of the compression stroke. The controller may further change when the temperature of the engine body increases from below the predetermined value to above the predetermined value, the timing of the final injection within the first engine speed range from the late stage of the intake stroke to after the intake valve is closed in the earlier-half stage of the compression stroke.

The control device may further include a second detector for detecting an intake air temperature of the engine body. Based on a detection result by the second detector for detecting the intake air temperature of the engine body, the controller may set the final injection within the first engine speed range to be in the earlier-half stage of the compression stroke when the intake air temperature of the engine body is above a predetermined value, and may set the final injection to be in the late stage of the intake stroke when the intake air temperature is below the predetermined value.

When the operating state of the engine body is within the first engine speed range, the controller may set the injection mode of the fuel injection valve to the divided injections in which two injections of a first injection that is performed on the intake stroke and a second injection that is performed in the earlier-half stage of the compression stroke are performed, when the operating state of the engine body is within the second engine speed range, the controller may set the injection mode of the fuel injection valve to the divided injections in which two injections of a first injection that is performed in the middle stage of the intake stroke and a second injection that is performed in the late stage of the intake stroke are performed, and when the engine speed is relatively high, the controller may set a ratio of a first injection amount with respect to the total injection amount higher than when the engine speed is relatively low.

When the operating state of the engine body is within the particular operating range, the controller may set the injection mode of the fuel injection valve to the divided injections in which two injections of a first injection and a second injection are performed, may perform the first injection on the intake stroke when the second injection is performed in the earlier-half stage of the compression stroke, and may perform the first injection in the middle stage of the intake stroke when the second injection is performed in the late stage of the intake stroke. When the timing of the second injection is set to be in the late stage of the intake stroke, the controller may set a ratio of a second injection amount with respect to the total injection amount lower than when the ignition timing of the second injection is set to be in the earlier-half stage of the compression stroke.

The controller may set the ignition timing to be during an expansion stroke after a top dead center on the compression stroke for the first engine speed range, and during the compression stroke after the top dead center on the compression stroke for the second engine speed range.

A pressure of the fuel to be supplied to the fuel injection valve may be increased as the engine speed increases.

When the engine body is at least within the particular operating range, a tumble ratio of inside the cylinder may be 1.5:1 or above. A strengthened tumble flow shortens the combustion period, and can be advantageous in improving the anti-knock performance in the high compression ratio engine and, further, increasing the torque.

DETAILED DESCRIPTION OF THE EMBODIMENTS

Figure 1:
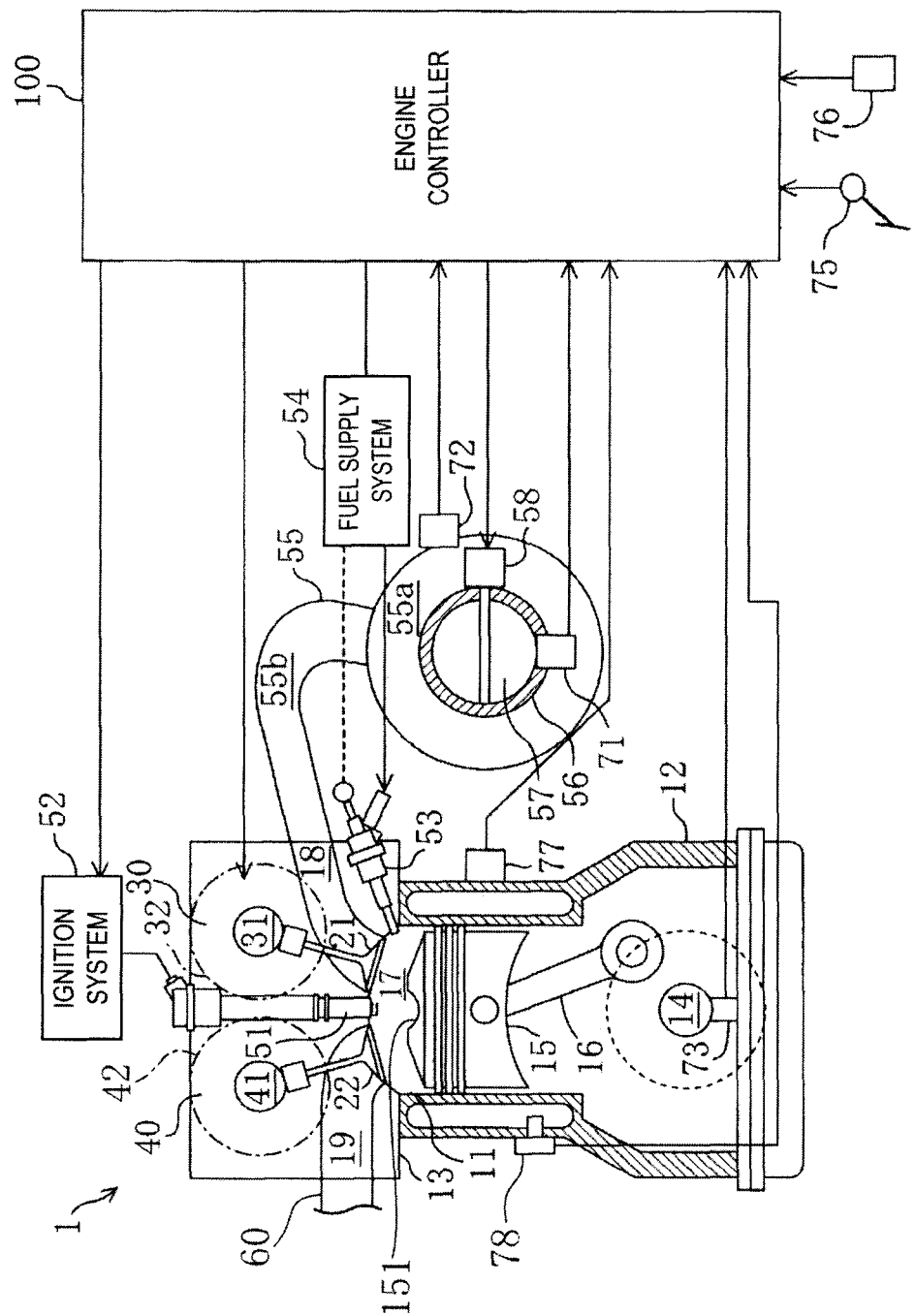
FIG. 1 is a schematic block diagram showing a configuration of a spark-ignition direct injection gasoline engine and a control device thereof.

Hereinafter, a method and device for controlling a spark-ignition direct injection engine are described in detail with reference to the appended drawings. Note that, the following description of a preferred embodiment is merely an illustration. As shown in FIG. 1, an engine system of this embodiment has an engine 1 (engine body), various kinds of actuators associated with the engine 1, various kinds of sensors, and an engine controller 100 for controlling the actuators based on signals that are transmitted from the sensors. This engine system includes the high compression ratio engine 1 in which its geometric compression ratio is 12:1 or above, and, within a particular operating range where an engine speed is comparatively low and a load is high, in other words, within an operating range where knocking easily occurs, achieves an increased torque in the high compression ratio engine 1 while effectively suppressing knocking.

Figure 2:
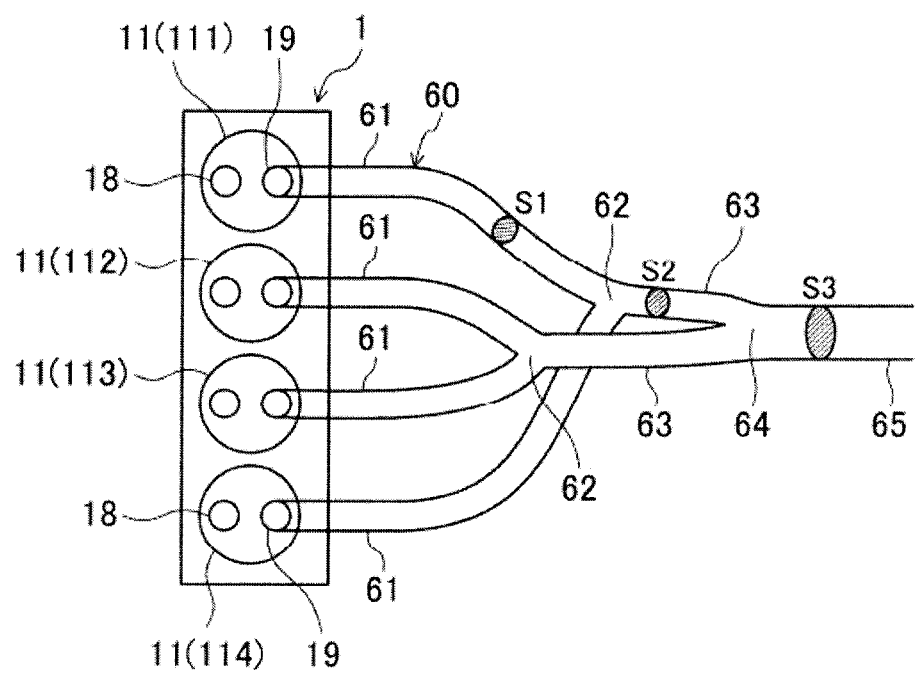
FIG. 2 is a schematic plane view of an engine body and an exhaust manifold.

The engine 1 is a spark-ignition internal combustion engine, and includes four, from the first to fourth, cylinders 111, 112, 113 and 114 as shown in FIG. 2. Note that, hereinafter, when it is not limited to a particular cylinder among the first to fourth cylinders, the numeral "11" is designated to the corresponding cylinder or cylinders. The engine 1 is mounted in a vehicle, such as an automobile, and an output shaft (not illustrated) thereof is coupled to drive wheels via a transmission. An output from the engine 1 is transmitted to the drive wheels and, thereby, the vehicle is propelled. The engine 1 includes a cylinder block 12 and a cylinder head 13 that is mounted on top of the cylinder block 12, and the cylinders 11 are formed inside the cylinder block 12. As commonly known, a crank shaft 14 is rotatably supported within the cylinder block 12 by journals and bearings, and this crank shaft 14 is coupled to pistons 15 via connecting rods 16, respectively.

Each of the ceiling parts of the cylinders 11 is formed with two inclined surfaces extending from substantially the center of the ceiling part to near a lower end surface of the cylinder head 13, and the inclined surfaces lean on each other to form a roof like shape, that is, a pent-roof type form.

Each of the pistons 15 is slidably fitted inside each of the cylinders 11, and partitions a combustion chamber 17 along with the cylinder 11 and the cylinder head 13. Each of top surfaces of the pistons 15 is formed into a trapezoid shape bulging from a circumferential edge toward a center part thereof so as to correspond to the shape of the pent-roof type ceiling surface of the cylinder 11. Thereby, a combustion chamber volume of when the piston 15 reaches a top dead center on compression stroke is reduced and the geometric compression ratio as high as 12:1 or above is achieved. A cavity 151 concaved in a substantially spherical shape is formed in the substantially center position of the top surface of the piston 15. Each cavity 151 is positioned to face against an ignition plug 51 arranged in a center part of the cylinder 11, and thereby, a combustion period is shortened. That is, as described above, the high compression ratio engine 1 is configured such that each top surface of the pistons 15 is bulged and each space between the top surface of the piston 15 and the ceiling surface of the cylinder 11 becomes extremely small when the piston 15 reaches the top dead center on the compression stroke. Therefore, if the cavity 151 is not formed, a flame in the earlier combustion stage interferes with the top surface of the piston 15 to cause an increase in cooling loss, and thereby, a flame diffusion is impeded and a combustion speed is delayed. On the other hand, with the cavity 151 described above, the interference of the flame in the earlier combustion stage is avoided and a further development of the flame is not impeded, therefore, the flame diffusion speed is increased and the combustion period can be shortened. Thus, it is advantageous in regards to suppressing the occurrence of knocking and contributes to increasing the torque due to an advanced ignition timing.

An intake port 18 and an exhaust port 19 are formed in the cylinder head 13 and are communicated with the combustion chamber 17, for every cylinder 11. An intake valve 21 and an exhaust valve 22 are arranged so as to be able to shut-off (close) the intake port 18 and the exhaust port 19 from the combustion chamber 17, respectively. The intake valve 21 is actuated by an intake valve activating system 30 and the exhaust valve 22 is actuated by an exhaust valve activating system 40, and, therefore, the valves move up and down at predetermined timings by being controlled thereby to open and close the intake port 18 and the exhaust port 19, respectively.

The intake valve activating system 30 and the exhaust valve activating system 40 have an intake camshaft 31 and an exhaust camshaft 41, respectively. The camshafts 31 and 41 are coupled to the crank shaft 14 via a power transmission mechanism such as a chain-sprocket mechanism which is commonly known. As commonly known, the power transmission mechanism rotates the camshafts 31 and 41 360° while the crank shaft 14 rotates 720°.

The intake valve activating system 30 includes a variable intake valve timing mechanism 32 that can change opening and closing timings of the intake valve 21, and the exhaust valve activating system 40 includes a variable exhaust valve timing mechanism 42 that can change opening and closing timings of the exhaust valve 22. In this embodiment, the variable intake valve timing mechanism 32 is configured by a hydraulically or mechanically controlled phase variable mechanism (Variable Valve Timing: VVT), which can continuously vary a phase of the intake cam shaft 31 within a predetermined range. Further in this embodiment, the variable exhaust valve timing mechanism 42 is configured by a hydraulically or mechanically controlled phase variable mechanism, which can continuously vary a phase of the exhaust cam shaft 41 within a predetermined range. The variable intake valve timing mechanism 32 changes the closing timing of the intake valve 21 to adjust an effective compression ratio, and constitutes a compression ratio adjusting mechanism. Note that, the effective compression ratio is a ratio of a combustion chamber volume when the intake valve is closed, to a combustion chamber volume when the piston 15 is at the top dead center.

Thereby, with the engine 1, as described in detail below, when an operating state of the engine 1 is within the particular operating range where the engine speed is comparatively low and the load is high, the closing timing of the intake valve 21 (IVC) is set so that the effective compression ratio becomes 10:1 through the control by the variable intake valve timing mechanism 32. Further, the opening timing of the exhaust valve 22 (EVO) is set through the control by the variable exhaust valve timing mechanism 42 so that an open valve overlap time period OL of the intake valve 21 and the exhaust valve 22 (see FIGS. 8(a) and 8(b)) is secured for a predetermined time period according to an engine speed.

Further, in the engine 1, by devising the shape of the intake port 18 in this embodiment, a tumble ratio is 1.5:1 or above when the operating state of the engine 1 is within the particular operating range where the engine speed is low and the load is high. Here, the tumble ratio is defined by the number of vertical rotations of an intake air swirl in one intake stroke. The tumble ratio being 1.5:1 or above means that the number of the vertical rotations of an intake air swirl is 1.5 or above in one intake stroke. Such a high tumble ratio shortens the combustion period to improve an anti-knock performance, and therefore, becomes advantageous in increasing the torque in the high compression ratio engine 1.

Each of the ignition plugs 51 is attached to the cylinder head 13 in a well know configuration such as by a thread. Each electrode of the ignition plugs 51 faces the ceiling part of the combustion chamber 17 at substantially the center of the cylinder 11. An ignition system 52, upon receiving a control signal from the engine controller 100, distributes a power to each of the ignition plugs 51 so that it generates a spark at a desired ignition timing.

Fuel injection valves 53 are attached to, in this embodiment, one side (on an intake side in the illustration) of the cylinder head 13 by a well known configuration such as using brackets. The engine 1 is so called a direct injection engine for directly injecting a fuel inside the cylinders 11. Therefore, each end of the fuel injection valve 53 is positioned below the intake port 18 in a vertical direction and at the center of the cylinder 11 in a horizontal direction, and faces inside the combustion chamber 17. Note that, the arrangement of the fuel injection valve 53 is not limited to this. The fuel injection valve 53 of this embodiment is a multi nozzle hall type (e.g., six halls) fuel injection valve (Multi Hall Injector: MHI). Although oriented directions of the multi nozzle halls are not illustrated, a tip of a nozzle hall stem thereof is flared so that the fuel can be injected throughout the cylinder 11. The MHI is advantageous in that, because of the multi nozzle halls, a diameter of each nozzle hole is small and the fuel can be injected with a comparatively high fuel pressure, and that, because the tip of the nozzle hall stem is flared to be able to inject the fuel throughout the cylinder 11, a mixing performance of the fuel is improved and vaporization and atomization of the fuel are promoted. Therefore, when the fuel is injected during the intake stroke, it is advantageous in that the mixing performance of the fuel using an intake flow inside the cylinder 11 and the vaporization and atomization of the fuel are promoted, as well as when the fuel is injected during the compression stroke, it is advantageous regarding to the gas cooling inside the cylinder 11 due to the vaporization and atomization of the fuel. Note that, the fuel injection valve 53 is not limited to such an MHI.

A fuel supply system 54 includes a high pressure pump (fuel injection pump) for pressurizing to supply the fuel to the fuel injection valve 53, a pipe or a hose for introducing the fuel from a fuel tank to the high pressure pump, and an electric circuit for controlling the fuel injection valve 53. If the fuel injection valve 53 is the multi nozzle hall type, a fuel injection pressure is set to be comparatively high because the fuel is injected from the tiny nozzle halls. The electric circuit receives the control signal from the engine controller 100 to activate the fuel injection valve 53 and allows a desired amount of fuel to be injected inside the combustion chamber 17 at a predetermined timing. Here, the fuel supply system 54 sets the fuel pressure to be high corresponding to an increase of the engine speed. Thus, it is advantageous regarding to the vaporization and atomization of the fuel as well as shortening a pulse width relating to the fuel injection from the fuel injection valve 53 as much as possible because of the fuel pressure increase, in addition to the increased fuel amount to be injected inside the cylinder 11 corresponding to the increase of the engine speed.

The intake port 18 is communicated with a surge tank 55a by an intake passage 55b within an intake manifold 55. An intake air flow from an air cleaner (not illustrated) passes through a throttle body 56 and is supplied to the surge tank 55a. The throttle body 56 is arranged with a throttle valve 57. The throttle valve 57, as it is well known, throttles the intake air flow toward the surge tank 55a to adjust an amount of the flow. A throttle actuator 58 receives the control signal from the engine controller 100 and adjusts an opening of the throttle valve 57.

The exhaust port 19 is, as it is well known, communicated with a passage inside an exhaust pipe by an exhaust passage within the exhaust manifold 60. As illustrated in FIG. 2, the exhaust manifold 60 has a structure in which each pair of branched exhaust passages 61 connected with the exhaust ports 19 of the cylinders 11 which are not adjacent in an order of exhaust therefrom is merged within a first merging part 62, and intermediate exhaust passages 63, each located downstream of the first merging parts 62 are merged within a second merging part 64. In a four cylinder engine where the exhaust stroke is performed in an order of the first cylinder 111, the third cylinder 113, the fourth cylinder 114, and then the second cylinder 112, among the four branched exhaust passages 61 connected with the exhaust ports 19 of the cylinders 11, respectively, the branched exhaust passages 61 communicated with the first and fourth cylinders 111 and 114 are merged together while the branched exhaust passages 61 communicated with the second and third cylinders 112 and 113 are merged together, and the two first merging parts 62 and the two intermediate exhaust passages 63 in the downstream thereof are formed. Further, the two intermediate exhaust passages 63 are merged within the second merging part 64, and downstream of the second merging part 64 serves as one exhaust passage 65. Thereby, so called a 4-2-1 layout is adopted for the exhaust manifold of the engine 1.

Passage areas of these passages are set so that relations among a passage area S1 of one branched exhaust passage 61, a passage area S2 of one intermediate exhaust passage 63, and a passage area S3 of the exhaust passage 65 in the downstream of the second merging parts 64 become (S2/S1)<(S3/S2). That is, an enlarged amount of the passage area S2 of the intermediate exhaust passage 63 with respect to the passage area S1 of the branched exhaust passage 61 is comparatively small and, an enlarged amount of the passage area S3 of the exhaust passage 65 in the downstream of the second merging parts 64 with respect to the passage area S2 of the intermediate exhaust passage 63 is larger when compared thereto.

Figure 3:
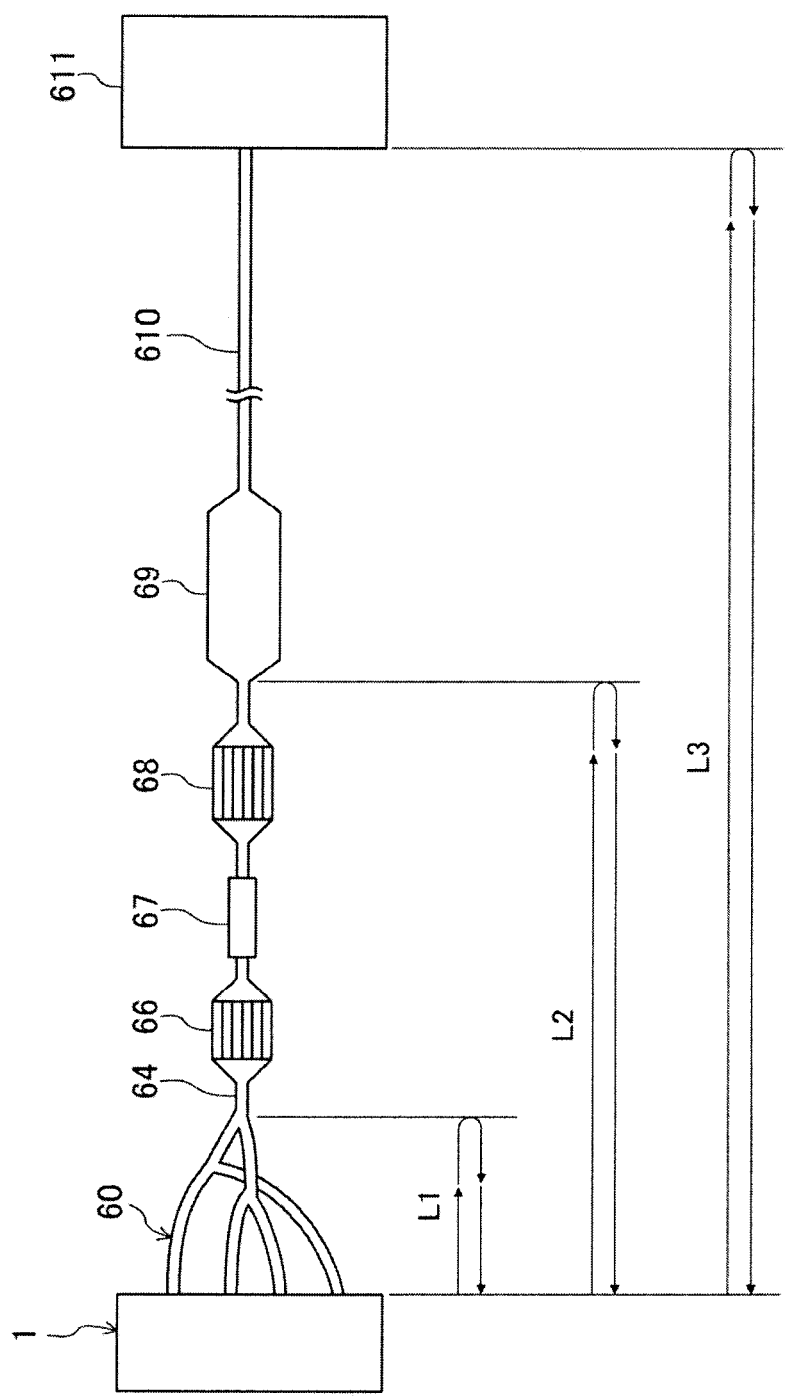
FIG. 3 is a schematic plane view of an exhaust system of the engine.

FIG. 3 shows a schematic configuration of an exhaust system including the exhaust manifold 60 and parts downstream thereof. As shown in FIG. 3, a direct catalyst 66 is connected with the exhaust passage downstream of the second merging part 64 of the exhaust manifold 60, and a catalyst 68 is connected further downstream thereof via a flexible joint 67. Each of the direct catalyst 66 and the catalyst 68 purifies exhaust gas and is arranged with catalyzers inside a flow path within a cylindrical case.

Further, a plurality of hollow enlarged chambers formed with a space where an exhaust passage cross-section is enlarged are arranged therein downstream of the exhaust manifold 60, and in this embodiment, a pre-silencer 69 and a main silencer 611 constitute the hollow enlarged chambers, respectively. The pre-silencer 69 is connected downstream of the catalyst 68. The main silencer 611 is connected downstream of the pre-silencer 69 via an exhaust pipe 610 with a predetermined length. As described below, a passage length L2 from the cylinders 11 to the pre-silencer 69 is set to satisfy 3L1<L2<4L1 with respect to a passage length L1 from the cylinders 11 to the second merging part 64 of the exhaust manifold 60, and a passage length L3 from the cylinders 11 to the main silencer 611 is set to satisfy 5L1<L3<7L1 with respect thereto.

With reference to FIG. 1, the engine controller 100 is a commonly known controller having a micro computer as its base, and includes a central processing unit (CPU) for executing a program, a memory constituted with, for example, a RAM and a ROM and for storing the program and data, and an input/output (I/O) bus for inputting and outputting an electric signal.

The engine controller 100 receives various kinds of inputs such as a flow amount and a temperature of the intake air that is obtained from an air flow sensor 71, an intake manifold pressure that is obtained from an intake pressure sensor 72, a crank angle pulse signal that is obtained from a crank angle sensor 73, and a coolant temperature of the engine that is obtained from a coolant temperature sensor 78. The engine controller 100 calculates the engine speed based on, for example, the crank angle pulse signal. Further, the engine controller 100 receives an accelerator opening signal from an accelerator opening sensor 75 for detecting a depressed amount of an accelerator pedal. Moreover, the engine controller 100 is inputted with a vehicle speed signal from a vehicle speed sensor 76 for detecting a rotational speed of an output shaft of a transmission. In addition, a knock sensor 77 configured with an acceleration sensor for converting vibrations of the cylinder block 12 into a voltage signal to output is attached to the cylinder block 12, and the output signal therefrom is also inputted to the engine controller 100.

Based on such inputs, the engine controller 100 calculates a parameter of controlling the engine 1 as follows: for example, a throttle opening signal of a desired level, a fuel injection pulse, an ignition signal, a valve phase angle signal. Then the engine controller 100 outputs the signals to the throttle actuator 58, the fuel supply system 54, the ignition system 52, and as well as the variable intake and exhaust valve timing mechanisms 32 and 42.

Thus, by performing controls for effectively suppressing knocking, the high torque in the high compression ratio engine 1 is achieved on this engine system which, because of the high compression engine 1, has a tendency to cause knocking within the particular operating range, where the engine speed is comparatively low and the load is high, and usually a high torque cannot be secured due to greatly retarding the ignition timing to avoid knocking. For the controls relating to suppressing knocking, two controls, one relating to scavenging and another relating to the fuel injection and ignition timing, are combined together in this embodiment. Hereinafter, each of the controls is described in sequence.

Control Relating to Scavenging

The control relating to scavenging is performed by a combination of the control of the opening and closing timings of the intake and exhaust valves 21 and 22, which is performed by controlling the variable intake valve timing mechanism 32 and the variable exhaust valve timing mechanism 42 by the engine controller 100, with the configuration of the exhaust system including the exhaust manifold 60 with the 4-2-1 layout.

Specifically, according to the operating state of the engine 1 including the engine speed and an engine load, within the particular operating range where the engine speed is comparatively low (low and middle speed ranges) within the high load range, the engine controller 100 controls the closing timing of the intake valve 21 (IVC) through the control of the variable intake valve timing mechanism 32 so that the effective compression ratio becomes 10:1 or above. Further, within the particular operating range, the opening timing of the exhaust valve 22 (EVO) is changed according to the engine speed so that a negative pressure wave due to an exhaust pulsation reaches the exhaust port 19 of the cylinder 11 during the open valve overlap period OL within a plurality of engine speed ranges, while securing the open valve overlap period OL for a predetermined period. Note that, here, the opening timings IVO and EVO and the closing timings IVC and EVC of the intake and exhaust valves 21 and 22 are defined with 0.3 mm of valve lift amount. 0.3 mm of valve lift amount corresponds to a ramp part which is not illustrated (a zone around opening and closing the valves where an inclination degree of the valve lift curve is gentle) in a valve lifting property. Therefore, the opening periods and the open valve overlap period OL of the intake and exhaust valves 21 and 22 corresponds to a period from which a period of the ramp part is excluded.

The exhaust manifold 60 prevents exhaust gas interference among the cylinders 11 from causing an adverse influence in scavenging performance and has a structure advantageous in that the negative pressure due to the exhaust pulsation reaches the exhaust port 19 during the open valve overlap period to provide a function of improving the scavenging.

First, the exhaust gas interference among the cylinders is explained. Immediately after the exhaust valve 22 of a predetermined cylinder (e.g., the third cylinder 113), a high positive pressure is generated within the exhaust port 19 by the rapid outflow of exhaust gas, so called a blowdown. Further, the open valve overlap period OL of the first cylinder 111 starts slightly after the timing of when the exhaust valve 22 of the third cylinder 113 opens. Then, a positive pressure wave caused inside the third cylinder 113 is transmitted to the other cylinders. With the exhaust manifold 60 with the 4-2-1 layout of this embodiment as shown in FIG. 2, the positive pressure wave caused inside the third cylinder 113 passes through the branched exhaust passage 61 and the intermediate exhaust passage 63 between the third cylinder 113 and the second merging part 64, and further through the intermediate exhaust passage 63 and the branched exhaust passage 61 between the second merging part 64 and the first cylinder 111, to be transmitted to the first cylinder 111, thereby, a pressure transmission path becomes longer. Thereby, a timing of the positive pressure wave to reach the exhaust port 19 of the first cylinder 111 is delayed and even within lower and middle speed ranges of about 2,000 rpm and 4,000 rpm, the positive pressure wave is avoided from reaching the exhaust port 19 of the first cylinder 111 during the open valve overlap period OL, thereby, a degradation of the scavenging performance due to the exhaust gas interference is prevented.

Figure 4:
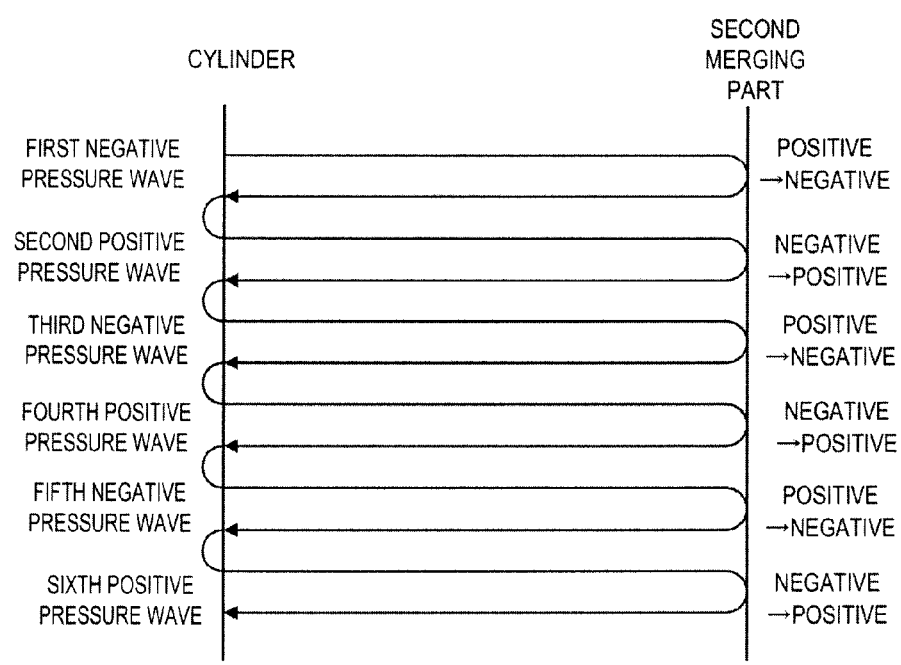
FIG. 4 is an explanatory chart showing a state where a pressure wave travels back and forth between a cylinder and a second merging part of the exhaust manifold.
Figure 5:
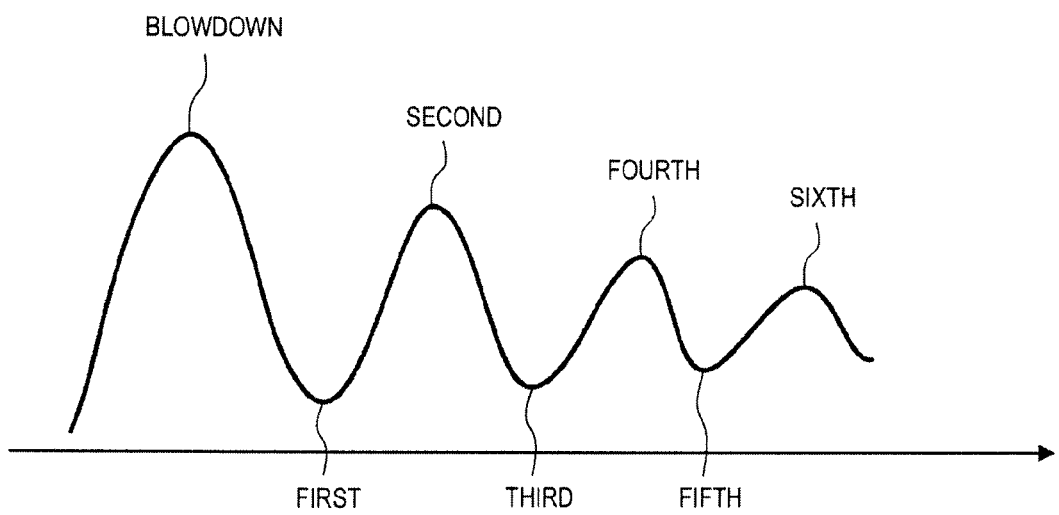
FIG. 5 is a chart showing a change of pressure caused in an exhaust port of the cylinder.

Next, such a pressure wave from the exhaust pulsation that affects within the exhaust port 19 is described in detail with reference to FIGS. 4 and 5. In each cylinder 11, the high positive pressure wave is generated by the blowdown after the exhaust valve 22 is opened, and thereby, the exhaust pulsation is caused within the exhaust manifold 60. In the exhaust manifold 60 shown in FIG. 2, the pressure wave is hardly reversed in its direction in the first merging part 62 where the branched exhaust passages 61 of the cylinders 11 which are not adjacent in the order of exhaust therefrom merge together, and passes through, and the pressure wave is reflected to reverse in its direction in the second merging part 64. Thereby, as shown in FIG. 4, the pressure wave travels back and forth between the cylinder 11 and the second merging part 64 and the pressure reverses from positive to negative in the second merging part 64, and thereby, the negative pressure wave and the positive pressure wave alternately reach the exhaust port 19. Therefore, a first (first round trip), a third (third round trip), and a fifth (fifth round trip) are the negative pressure wave, and a second (second round trip), a fourth (fourth round trip), and a sixth (sixth round trip) are the positive pressure wave. Thus, as shown in FIG. 5, the pressure that affects within the exhaust port 19 varies and gradually decays as the round trip of the pressure wave is repeated while the negative pressure and the positive pressure alternate. Therefore, when such a negative pressure wave due to the exhaust pulsation reaches the exhaust port 19 during the open valve overlap period OL, a function in which the exhaust gas is sucked out from the cylinder 11 and the scavenging performance is improved can be obtained.

Note that, if the engine speed changes, because a time length from a generation timing of the positive pressure wave immediately after the exhaust valve 22 is opened to the start of the open valve overlap period changes, the timing of the negative pressure wave to reach the exhaust port 19 changes with respect to the open valve overlap period. Here, for example, if the passage length from the cylinder 11 to the second merging part 64 is set so that, within an engine speed range of around 5,000 rpm, the first negative pressure wave reaches the exhaust port 19 during the open valve overlap period, within an engine speed range of about 2,500 to 3,000 rpm, the third negative pressure wave reaches the exhaust port 19 during the open valve overlap period, and within an engine speed range of about 1,500 to 2,000 rpm, the fifth negative pressure wave reaches the exhaust port 19 during the open valve overlap period. Thereby, the scavenging performance is improved by the negative pressure wave even within the lower and middle speed range of the engine. With the exhaust manifold 60 shown in FIG. 2, such setting can be performed. Thus, in the exhaust manifold 60, over the ranges from the low speed range to the high speed range, the degradation of the scavenging performance due to the exhaust interference is avoided and, thereby, a volumetric efficiency of the intake air is improved, and further, within the particular engine speed ranges such as around 2,000 rpm, around 3,500 rpm, and around 5,000 rpm, the negative pressure wave affects within the exhaust port 19 during the open valve overlap period OL and, thereby, the scavenging performance is improved.

Meanwhile, if the opening timing of the exhaust valve 22 and the open valve overlap period OL are fixed, the negative pressure wave reaches the exhaust port 19 during the open valve overlap period OL only within the particular engine speed ranges, and within the other engine speed ranges, the timing of the negative pressure wave to reach the exhaust port 19 and the open valve overlap period OL deviate. Whereas, in this embodiment, because the opening timing of the exhaust valve 22 can be changed according to the engine speed, within many engine speed ranges, the negative pressure wave reaches the exhaust port 19 during the open valve overlap period OL. Specifically, as indicated in Table (1), the opening and closing timings of the exhaust and intake valves 22 and 21 can be changed according to the engine speed, respectively.

TABLE 1

| rpm | EVO | EVC | IVO | IVC | (1) |
|---|---|---|---|---|---|
| 1500 | 11 | 50 | 42 | 36 | |
| 2000 | 39 | 22 | 42 | 36 | |

TABLE 1-continued

| rpm | EVO | EVC | IVO | IVC | (1) |
|---|---|---|---|---|---|
| 2500 | 11 | 50 | 42 | 36 | |
| 3000 | 24 | 37 | 42 | 36 | |
| 3500 | 34 | 27 | 38 | 40 | |
| 5000 | 49 | 12 | 26 | 52 | |

Note that, within Table 1, the numeral values indicating the opening and closing timings of the exhaust and intake valves 22 and 21, respectively, are a crank angle before a bottom dead center (BBDC) for the opening timing of the exhaust valve 22 (EVO), a crank angle after the top dead center (ATDC) for the closing timing of the exhaust valve 22 (EVC), a crank angle before the top dead center (BTDC) for the opening timing of the intake valve 21, and a crank angle after the bottom dead center (ABDC) for the closing timing of the intake valve 21 (IVC) (each unit: ° C.A).

Based on Table 1, the opening timing of the exhaust valve 22 (EVO) is retarded the most at BBDC 11° when the engine speed is 1,500 rpm, at this time, the fifth (fifth round trip) negative pressure wave reaches the exhaust port 19 during the open valve overlap period OL. Further, from 1,500 rpm to an extent where the engine speed exceeds 2,000 rpm, the opening timing of the exhaust valve 22 (EVO) is gradually advanced as the engine speed increases and, thereby, the state where the fifth (fifth round trip) negative pressure wave reaches the exhaust port during the open valve overlap period OL is maintained. When the engine speed reaches 2,500 rpm, the opening timing of the exhaust valve 22 (EVO) is retarded to BBDC 11° again, and at this time, the third (third round trip) negative pressure wave reaches the exhaust port 19 during the open valve overlap period OL. Further, from 2,500 rpm, the opening timing of the exhaust valve 22 (EVO) is gradually advanced as the engine speed increases and, thereby, the state where the third (third round trip) negative pressure wave reaches the exhaust port 19 during the open valve overlap period OL is maintained.

As above, within the lower and middle speed ranges of the engine, by changing the opening timing of the exhaust valve 22 (EVO) according to the engine speed, within the plurality of engine speed ranges, the negative pressure wave due to the exhaust pulsation is controlled to reach the exhaust port 19 during the open valve overlap period OL.

When the engine speed becomes within high speed range of about 4,000 rpm or above, the opening timing of the exhaust valve 22 (EVO) is kept on the advance side so that a large amount of exhaust gas can be discharged. Note that, even with the opening timing of the exhaust valve 22 (EVO) being kept on the advance side, around the engine speed of 5,000 rpm, as described above, the first (first round trip) negative pressure wave can reach the exhaust port 19 during the open valve overlap period OL.

Further, within the engine speed range from 1,500 rpm to 3,000 rpm, the closing timing of the intake valve 21 (IVC) is fixed to ABDC 36°. When the closing timing of the intake valve 21 (IVC) is at about such value, the effective compression ratio is not greatly reduced with respect to the geometric compression ratio, and becomes a value exceeding 10:1. When the engine speed becomes about 3,500 or above, the closing timing of the intake valve 21 (IVC) is gradually retarded according to the increase of the engine speed.

Note that, in this embodiment, because the exhaust and variable intake valve timing mechanisms 42 and 32 are phase-type variable valve timing mechanisms, respectively, the closing timing of the exhaust valve 22 (EVC) changes corresponding to the opening timing (EVO) thereof, and the opening timing of the intake valve 21 (IVO) changes corresponding to the closing timing (IVC) thereof.

Further, in the exhaust system described above, the pre-silencer 69 and the main silencer 611 promote within the predetermined engine speed ranges, the function in which the negative pressure wave due to the exhaust pulsation improves the scavenging performance. That is, the pressure wave caused by the blowdown immediately after the exhaust valve 22 is opened is reversed in the second merging part 64 and returns therefrom as described above, and generates the pulsation within the exhaust manifold 60, whereas a part of the pressure wave passes through the second merging part 64 and is transmitted to the downstream of the exhaust manifold 60. Further, the pressure wave is reversed by the pre-silencer 69 in the hollow enlarged chamber and returns therefrom, whereas a part of the pressure wave that has reached the pre-silencer 69 passes through the pre-silencer 69 is transmitted to further downstream and reversed by the main silencer 611 in the hollow enlarged chamber in the downstream and returns therefrom. That is, as indicated by the arrows of FIG. 3, the pressure wave that travels back and forth between the cylinder 11 and the pre-silencer 69 and the pressure wave that travels back and forth between the cylinder 11 and the main silencer 611 exist in addition to the pressure wave that travels back and forth between the cylinder 11 and the second merging part 64 of the exhaust manifold 60.

Further, within a predetermined first engine rotation speed range, the negative pressure wave that is reversed by the main silencer 611 reaches the exhaust port 19 during the open valve overlap period OL, within a third engine rotation speed range where the engine speed is higher than the first engine rotation speed range by a predetermined engine speed, the negative pressure wave that is reversed by the pre-silencer 69 reaches the exhaust port 19 during the open valve overlap period OL, and within a second engine rotation speed range between the first and third engine rotation speed ranges and within a fourth engine rotation speed range where the engine speed is higher than the third engine rotation speed range, the negative pressure wave due to the pulsation within the exhaust manifold 60 reaches the exhaust port 19 during the open valve overlap period OL.

Specifically, by setting the passage length L2 from the cylinder 11 to the pre-silencer 69 to satisfy $3L1<L2<4L1$, the timing of the negative pressure wave reversed by the pre-silencer 69 to reach the exhaust port 19 becomes close to the timing of either one of the third and fourth pressure waves due to the pulsation within the exhaust port 19 to reach the exhaust port 19. Further, by setting the passage length L3 from the cylinder 11 to the main silencer 611 to satisfy $5L1<L3<7L1$, the timing of the negative pressure wave reversed by the main silencer 611 to reach the exhaust port 19 becomes close to the timing of either one of the fifth and sixth pressure waves due to the pulsation within the exhaust port 19 to reach the exhaust port 19.

Through the setting as above, for example, within the engine speed range around 2,500 rpm (the third engine rotation speed range), the negative pressure wave reversed by the pre-silencer 69 reaches the exhaust port 19 during the open valve overlap period OL, and within the engine speed range around 1,500 rpm (the first engine rotation speed range), the negative pressure wave reversed by the main silencer 611 reaches the exhaust port 19 during the open valve overlap period OL. Thereby, within the various engine speed ranges, the negative pressure reaches the exhaust port 19 during the open valve overlap period OL, and the scavenging performance is improved.

Further, when the scavenging performance is improved by using the negative pressure due the exhaust pulsation, the volumetric efficiency of the intake air is improved and, thereby, the torque is increased. Moreover, the improvement of the scavenging performance reduces a temperature inside the cylinder 11 and is advantageous in suppressing knocking, therefore, the ignition timing can correspondingly be advanced (to approach MBT). Thereby, the torque of the high compression ratio engine 1 can be increased.

Control Relating to Fuel Injection Timing

Figure 6:
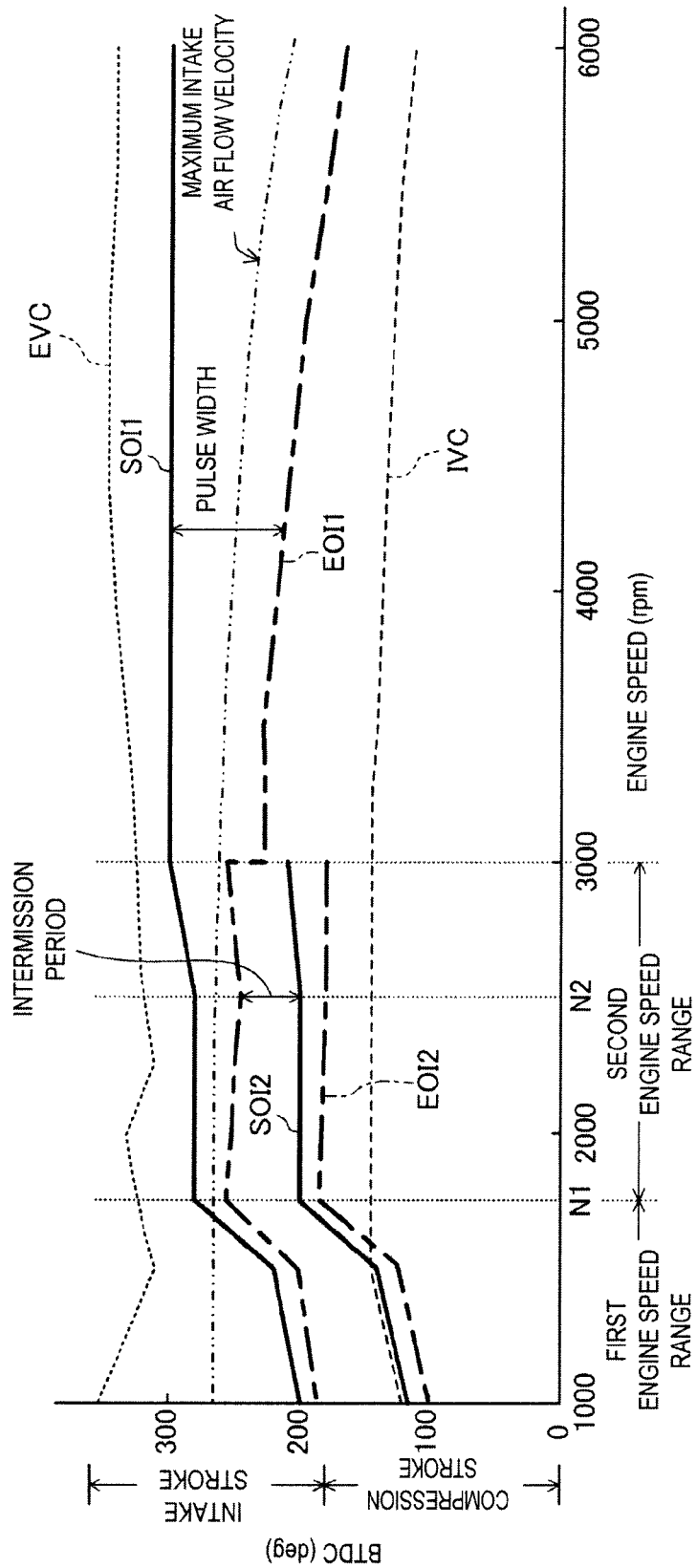
FIG. 6 is a chart showing a change of a fuel injection timing with respect to an engine speed.

Next, the control relating to the fuel injection timing that is performed by the engine controller 100 is described in detail with reference to FIG. 6. The control relating to the fuel injection timing is to achieve both an improvement in anti-knock performance and an increase in torque by performing a fuel injection that is divided into two injections: a first injection and a second injection. FIG. 6 shows an example of a relation of a fuel injection timing with the engine speed within the high load range and corresponds to a case where the temperature (coolant temperature) of the engine 1 is in a warmed-up state above a predetermined temperature and an intake air temperature is above a predetermined value. In FIG. 6, the broken line labeled as "EVC" indicates the closing timing of the exhaust valve 22 and the broken line labeled as "IVC" indicates the closing timing of the intake valve 21, and each of the closing timings of the exhaust and intake valves 22 and 21 follows the above described control relating to the scavenging. Further, the solid line labeled as "SOI1" indicates a start timing of the first injection and the one-dot chain line labeled as "EOI1" indicates an end timing of the first injection. Moreover, the solid line labeled as "SOI2" indicates a start timing of the second injection and the one-dot chain line labeled as "EOI2" indicates an end timing of the second injection. Therefore, a crank angle duration between the SOI1 and the EOI1 corresponds to a pulse width in which the fuel injection valve 53 injects the fuel in the first injection, and a crank angle duration between the SOI2 and the EOI2 corresponds to a pulse width in which the fuel injection valve 53 injects the fuel in the second injection. Note that, the vertical axis in FIG. 6 indicates the crank angle (° C.A), and because the fuel pressure is set higher corresponding to the increase of the engine speed, the pulse width shown in FIG. 6 and the fuel amount to be injected are not necessarily in proportion to each other.

Here, the particular operating range where the engine speed is comparatively low corresponds to the engine speed of 3,000 rpm or below. Meanwhile, within a range where the engine speed is high, that is above 3,000 rpm, an actual time length for the crank angle duration is short and, because the intake flow inside the cylinder 11 is high, knocking is less likely to occur, therefore, only the first injection is performed and the second injection is not performed. That is, the divided injections are not performed. The first injection is performed in the middle stage of the intake stroke. The performing timing of the first injection overlaps with a timing where an intake air flow velocity inside the cylinder 11 becomes the fastest as shown in the two-dot chain line of FIG. 6. This improves the cooling of the intake air and the mixing performance of the fuel, and, as described below, becomes advantageous in improving the torque.

Whereas, within the particular operating range where the engine speed is 3,000 rpm or below, because knocking is more likely to occur, by performing two separate fuel injections, the first and second injections, during a period from the beginning of the intake stroke to an earlier-half stage of the compression stroke, both the improvement in anti-knock performance and the increase in torque are aimed to be achieved.

Within a relatively low speed range (first engine speed range) of the particular operating range, where the engine speed is below a first predetermined value N1, the first injection is performed in the late stage of the intake stroke and the second injection is performed in the earlier-half stage of the compression stroke. Further, within a relatively high speed range (second engine speed range) of the particular operating range, where the engine speed is above the first predetermined value N1, the first injection is performed in the middle stage of the intake stroke and the second injection is performed in the late stage of the intake stroke.

The first engine speed range is the relatively low speed range and knocking easily occurs the most within this range. Therefore, within the first engine speed range, the ignition timing is greatly retarded with respect to the MBT and, as shown in FIG. 8(a), is set to be during an expansion stroke after the top dead center of the compression stroke so as to avoid knocking from occurring.

With the engine 1, for improving the torque while avoiding knocking from occurring within the first engine speed range, the engine controller 100 performs the second injection, which is the final injection of the divided injections, during the compression stroke. With the fuel injection during the compression stroke, because the gas inside the cylinder 11 is cooled by a latent heat caused by the vaporization of the fuel injected into the cylinder 11, a temperature of the gas inside the cylinder 11 is decreased and, thereby, the anti-knock performance is improved. Thus, because the ignition timing can be advanced corresponding to the improvement in anti-knock performance, the torque increases corresponding to the advanced amount of the ignition timing.

As above, within the first engine speed range, the torque is to be improved utilizing the cooling within the cylinder 11 due to the fuel injection during the compression stroke. However, even if all of a required injection amount of fuel is to be injected, the fuel is difficult to be completely vaporized prior to the ignition timing. Therefore, with the engine 1, as described above, the fuel is injected into the cylinder 11 in two separate injections, the first and second injections, and the first injection thereof is performed in the late stage of the intake stroke. The fuel injection during the intake stroke can secure a sufficient vaporization time. Further, performing the fuel injection in the late stage of the intake stroke and not in the middle stage thereof shortens a time length until the ignition timing as much as possible so as to suppress the latent heat from the vaporization of the fuel from being absorbed by, for example, a wall surface of the cylinder 11, and thereby, the latent heat can effectively be used in cooling the gas inside the cylinder 11. This is advantageous in improving the anti-knock performance described above. Moreover, the fuel injection during the intake stroke is advantageous in that the mixing performance of the fuel becomes high by the intake flow.

Further, within the speed range of about 1,500 rpm or below, the second injection is performed during the compression stroke as described above. More specifically, the second injection starts after the intake valve 21 is closed in the earlier-half stage of the compression stroke (indicated by the broken line (IVC) in FIG. 6). Performing the second injection in the earlier-half stage of the compression stroke secures the vaporization time of the fuel and becomes advantageous in improving the anti-knock performance and increasing the torque. By starting the second injection after the intake valve 21 is closed, the reverse flow of the fuel is avoided and all of the fuel injected into the cylinder 11 can be used for cooling the gas inside the cylinder 11. Thereby, it is further advantageous in improving the anti-knock performance.

Figure 8:
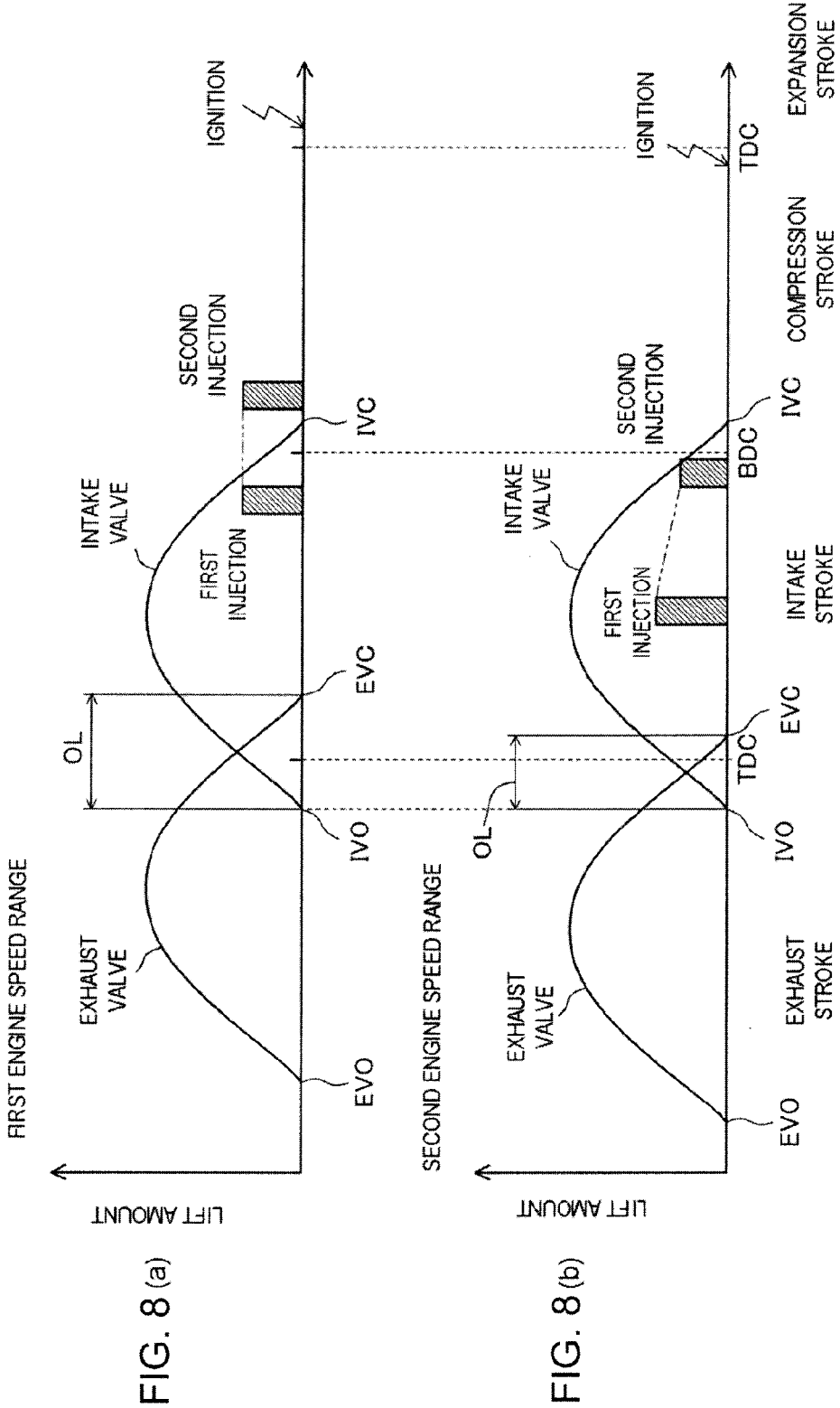
FIGS. 8(a) and 8(b) are charts showing examples of a relation among a lift curve of intake and exhaust valves, a fuel injection timing, and an ignition timing, where FIG. 8(a) corresponds to a first engine speed range and FIG. 8(b) corresponds to a second engine speed range.

As above, within the first engine speed range, as shown in FIG. 8 (a), the first injection is performed in the late stage of the intake stroke, the second injection is performed after the intake valve 21 is closed in the earlier-half stage of the compression stroke, and the ignition of the gas mixture inside the cylinder 11 is performed during the expansion stroke after the compression top dead center. Here, heights of bars indicating the first and second injections correspond to fuel injection amounts thereof, respectively. In this embodiment, the injection amounts of the first and second injections are set to satisfy a ratio of 5:5. Thereby, as described above, the improvements in mixing performance and the securing the vaporization time of the fuel, as well as the cooling of the gas inside the cylinder 11 are achieved, and the anti-knock performance and the torque are effectively improved and increased, respectively.

Note that, within the speed range of about 1,500 rpm or below, according to the decrease of the engine speed, the injection start timing of the first injection is retarded as well as the injection start timing of the second injection so as to correspond to the retardation of the closing timing of the intake valve 21. Thus, the reverse flow of the fuel injected in the second injection can be prevented. Moreover, the actual time length for the crank angle becomes longer as the engine speed decreases, therefore, even if the injection timings of the first and second injections are retarded within such low engine speed range, the actual time length from the fuel injection to the ignition becomes comparatively long and the required vaporization time can be secured.

Further, within the speed range of the first engine speed range, where the engine speed is 1,500 rpm or above, it is more advantageous in suppressing knocking as the engine speed increases, therefore, the injection timings of the first and second injections are gradually advanced so as to smoothly transition to a mode of the fuel injections within the second engine speed range described as follows.

The second rotation is a high speed range relative to the first engine speed range and is advantageous in suppressing knocking compared to the first range. Within the second engine speed range, although the ignition timing is retarded with respect to the MBT, as illustrated in FIG. 8(b), it is set to be during the compression stroke before the top dead center thereof.

For increasing the torque while avoiding the generation of knocking within the second engine speed range, with the engine 1, as described above, the first injection is performed in the middle stage of the intake stroke and the second injection is performed in the late stage of the intake stroke. That is, within the second engine speed range, the fuel injection is performed twice during the intake stroke.

Figure 9:
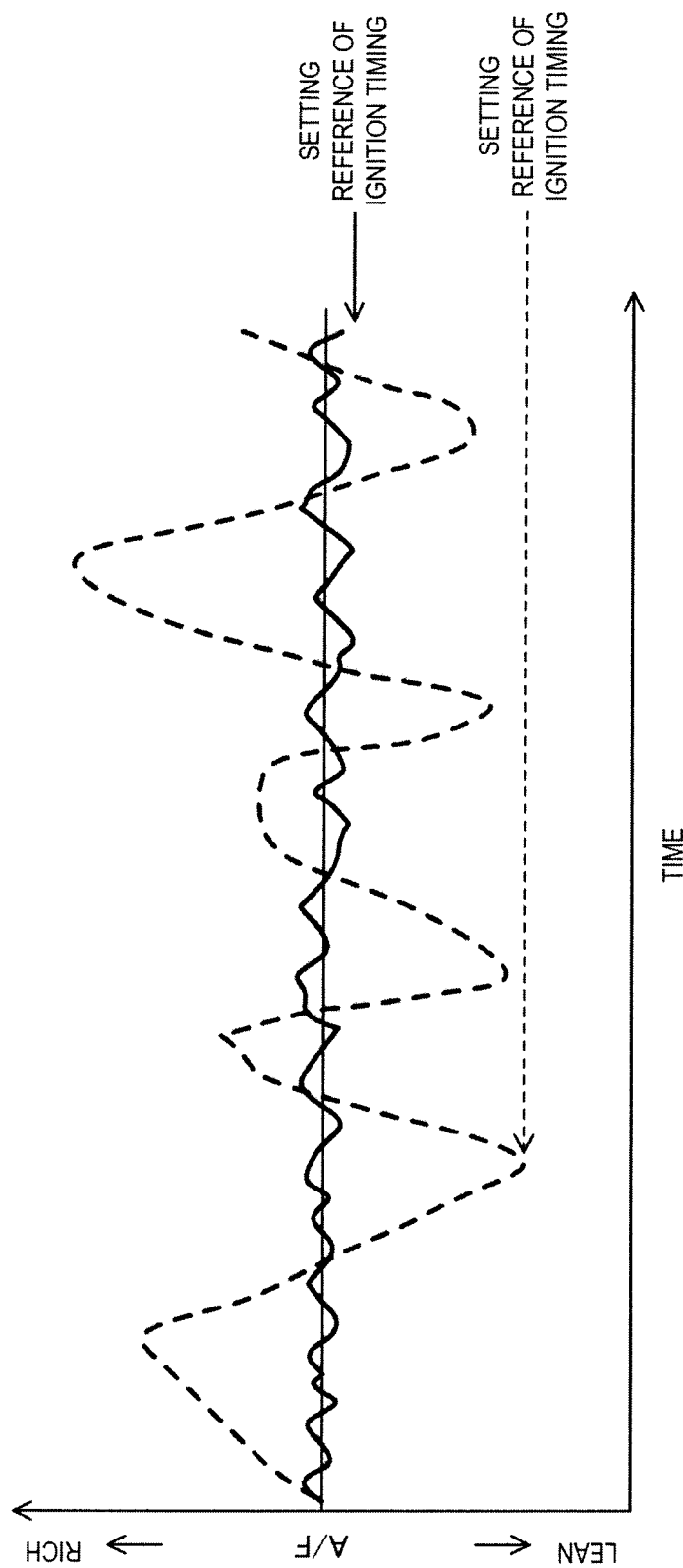
FIG. 9 is a chart explaining a variance of a setting reference of the ignition timing due to a variation in level of an air-fuel ratio inside the cylinder.

Between the two injections, the first injection overlaps with the timing for the intake air flow velocity inside the cylinder 11 to be the fastest (see the two-dot chain line of FIG. 6) due to the timing being in the middle stage of the intake stroke. That is, in FIG. 6, the line for the injection start timing of the first injection (see the solid line of SOI1) and the line for the injection end timing of the first injection (see the one-dot chain line of EOI1) sandwich the line for the maximum intake air flow velocity indicated by the two-dot chain line therebetween. The injection of the fuel during the intake stroke cools the intake air to be introduced into the cylinder 11, and therefore, improves the intake air charging efficiency and can be advantageous in increasing the torque. Further, injecting the fuel into the cylinder 11 at the timing when the intake flow is highly strong improves the mixing performance of the fuel. Thus, it becomes advantageous in suppressing knocking. For example, FIG. 9 is a chart explaining a relation between a variation level of an air-fuel ratio inside the cylinder 11 and a setting reference of the ignition timing. Knocking is easier to occur when the mixture gas inside the cylinder that is locally lean reaches within an area with end gas. Therefore, even if the leanest mixture gas reaches the end gas area, the ignition timing has to be retarded with respect to the MBT so as to avoid knocking from occurring. As indicated by the broken line in FIG. 9, when the variation level of the air-fuel ratio inside the cylinder 11 is high, the ignition timing has to be set with reference to the mixture gas that is significantly lean. Thereby, the ignition timing is significantly retarded with respect to the MBT. On the other hand, as indicated by the solid line in FIG. 9, when the variation level of the air-fuel ratio inside the cylinder 11 is low, even if the ignition timing is set with reference to the leanest gas mixture, the retarding amount of the ignition timing becomes small. Performing the first injection in the middle stage of the intake stroke where the intake air flow is highly strong may lower the variation level of the air-fuel ratio inside the cylinder 11 by improving the mixing performance of the fuel, therefore, as a result of being advantageous in suppressing knocking, it can be advantageous in increasing the torque by advancing the ignition timing.

While the first injection is performed in the middle stage of the intake stroke, the second injection is performed in the late stage of the intake stroke. The fuel injection performed in the late stage of the intake stroke cools the intake air and effectively improves the intake air charging efficiency. In view of avoiding the reverse flow of the fuel to the intake port 18, the second injection is preferred to end before the bottom dead center of the intake stroke (as described above, the closing timing of the intake valve 21 (IVC) is set to be after the bottom dead center of the intake stroke). Note that, according to the increase of the engine speed, because the intake of the air substantially continues even after the bottom dead center of the intake stroke (no reverse flow to the intake port 18) because of inertia, when the engine speed is comparatively high, the end timing of the second injection may be set to be after the bottom dead center of the intake stroke. Such a control is advantageous (described in detail below) in, regarding the fuel injection amount which increases according to the increase of the engine speed, securing a required pulse width and, due to an operation characteristic of the fuel injection valve 53, securing a required intermission period between the first and second injections.

As above, within the second engine speed range, as illustrated in FIG. 8 (b), the first injection is performed in the middle stage of the intake stroke, the second injection is performed in the late stage of the intake stroke, and the ignition of the gas mixture inside the cylinder 11 is performed during the compression stroke before the top dead center thereof. Within the second engine speed range, the first and second injection amounts are set to satisfy the ratio of 6:4 in this embodiment. Thereby, as described above, the improvements in the mixing performance of the fuel and the intake air charging efficiency can effectively be achieved, and the torque can significantly be increased while avoiding knocking.

Meanwhile, in the engine system, the engine controller 100 controls the fuel injection valve 53 to increase the fuel injection amount corresponding to the increase of the engine speed, as well as the fuel supply system 54 to increase the fuel pressure to be supplied to the fuel injection valve 54. Therefore, within the particular operating range, each of the injection amounts of the first and second injections increases according to the increase of the engine speed.

Here, each of the pulse widths of the first and second injections are widened according to the increase of the engine speed because each of the injection amounts of the first and second injections increases (note that, due to the fuel pressure increasing according to the increase of the engine speed, the fuel injection amount and the pulse width are not necessarily in proportion to each other). For example, within the second engine speed range, when the engine speed is between the first predetermined value N1 and the second predetermined value N2, by gradually retarding the injection end timings of the first and second injections (see EOI1 and EOI2) while maintaining the injection start timings thereof constant (see SOI1 and SOI2) with respect to the increase of the engine speed, the injections correspond to the widening of the pulse width.

However, because the two fuel injections are performed during the intake stroke within the second engine speed range, if the engine speed becomes higher than the second predetermined value N2, due to the operation characteristic of the fuel injection valve 53, the required intermission period cannot be secured between the injection end timing of the first injection and the injection start timing of the second injection. Therefore, when the engine speed becomes higher than the second predetermined value N2, both the injection start timing and the injection end timing of the first injection are advanced in the engine 1. Here, the injection timing of the first injection is set so that the injection start timing thereof is set on the retarding side of the opening timing of the exhaust valve 22 and overlaps with a timing in which the intake air flow velocity is at its fastest rate. On the other hand, the injection end timing of the second injection is set to be the bottom dead center of the intake stroke so that the reverse flow to the intake port 18 does not occur, whereas the injection start timing thereof is advanced according to the increase of the engine speed so as to correspond to the widening of the pulse width. Thereby, even when the engine speed is higher than the second predetermined value N2, the required intermission period is secured between the injection end timing of the first injection and the injection start timing of the second injection.

Note that, as described above, according to the increase of the engine speed, because the intake of the air substantially continues even after the bottom dead center of the intake stroke, when the engine speed is higher than the second predetermined value N2, the end timing of the second injection may be set to be after the bottom dead center of the intake stroke. Thereby, the timing of the second injection is moved relatively to the retarding side, therefore, the first injection timing can be moved to the retarding side upon securing the required intermission period. As result, the injection timing of the first injection easily overlaps with the timing for the maximum intake air flow velocity and, therefore, becomes advantageous in improving the above described mixing performance and intake air charging efficiency.

Figure 7:
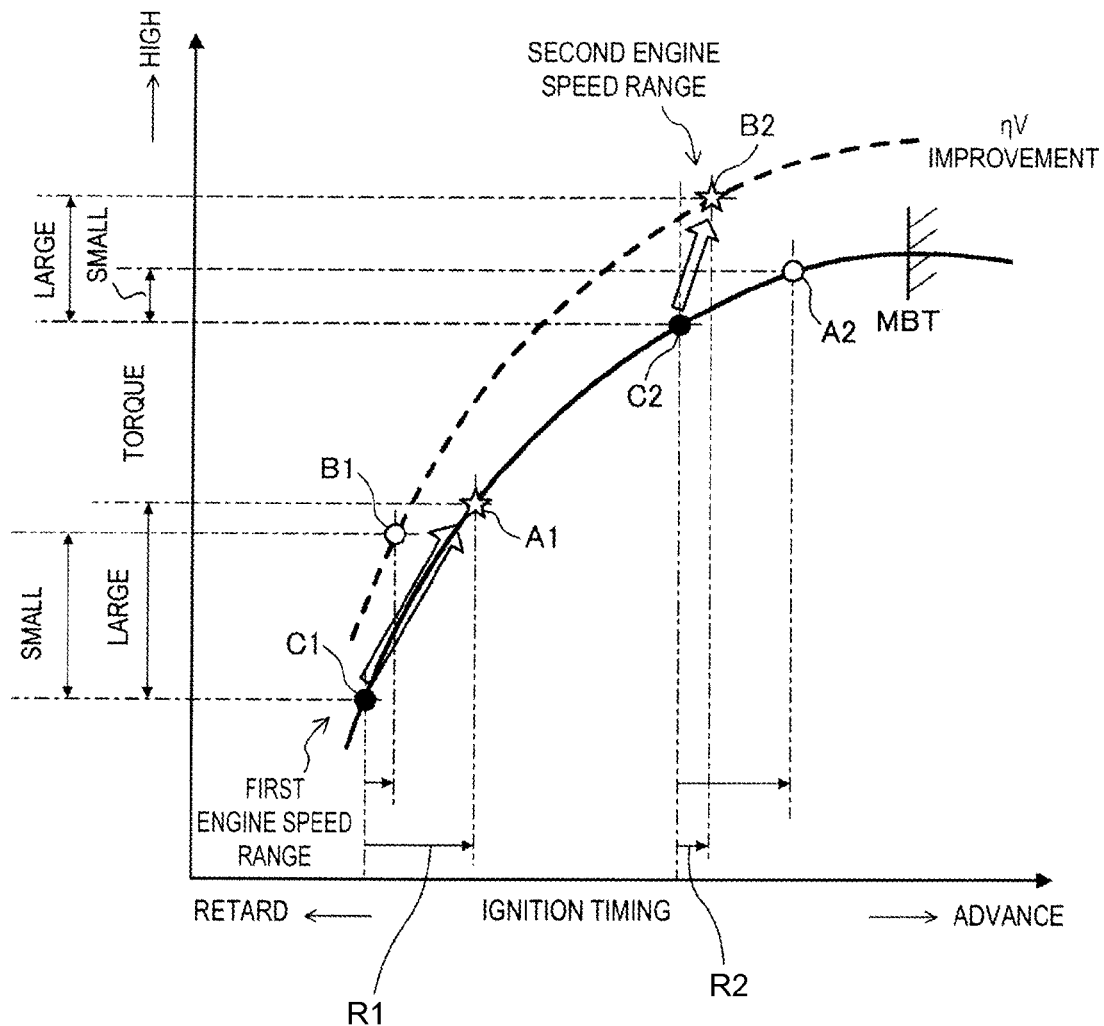
FIG. 7 is a chart showing a relation of a torque with respect to an ignition timing.

Here, a difference in fuel injection mode between the first and second engine speed ranges is described in detail with reference to FIG. 7. FIG. 7 shows a relation (characteristic curve) between the ignition timing and the torque in the engine having a predetermined geometric compression ratio (e.g., 14:1). The characteristic curve has the MBT as its peak and inclines more when the retarding amount with respect to the MBT is larger and inclines less when the retarding amount with respect the MBT is smaller. As shown in FIG. 8(a), the first engine speed range corresponds to a range where the retarding amount of the ignition timing with respect to the MBT is large, and as shown in FIG. 8(b), the second engine speed range corresponds to a range where the retarding amount of the ignition timing with respect to the MBT is small. Therefore, an increase of the torque within the first engine speed range when the ignition timing is advanced by a predetermined amount (e.g., 1° C.A) is larger than that within the second engine speed range when the ignition timing is advanced by the same amount. In the characteristic curve of FIG. 7, the black circle mark of C1 at a position corresponding to the first engine speed range and the black circle mark of C2 at a position corresponding to the second engine speed range represent the example of conventional characteristics in which measures toward improving the anti-knock performance and increasing the torque are not adapted. On the other hand, in the case where the anti-knock performance is improved by performing, for example, the fuel injection during the compression stroke to advance the ignition timing, the torque within the first engine speed range becomes as the star shaped mark of A1 on the characteristic curve line and the torque within the second engine speed range becomes as the white circle mark of A2 thereon. As above, by performing the fuel injection during the compression stroke, if the ignition timing is advanced by the same degree, the increased amount of the torque is larger within the first engine speed range than the second engine speed range.

Moreover in FIG. 7, in addition to the characteristic curve line indicated by the solid line, a characteristic curve line for a case where the intake air charging efficiency ($\eta V$) is improved is indicated by the broken line. Although the torque can be improved by increasing the intake air charging efficiency, the improvement in intake air charging efficiency causes a pressure increase inside the cylinder 11 and becomes disadvantageous in suppressing knocking. Therefore, within the first engine speed range which is originally disadvantageous in knocking performance, a knocking limit becomes further restrictive and the ignition timing cannot be advanced or is hardly advanced. On the other hand, within the second engine speed range which is relatively advantageous in knocking performance, the increase of the torque can effectively be achieved due to the improvement of the intake air charging efficiency. In the solid characteristic curve of FIG. 7, with respect to the black circle mark of C1 indicating the conventional example of the first engine speed range and the black circle mark of C2 indicating the conventional example of the second engine speed range, in the case where the intake air charging efficiency is improved and the torque is increased, in the broken line, the torque within the first engine speed range becomes as the white circle mark of B1 and the torque within the second engine speed range becomes as the star shaped mark of B2. Here, the advancing amount from C1 to B1 and the advancing amount from C2 to B2 are set to be the same.

As above, as measures toward increasing the torque while avoiding knocking, two kinds of measures exist: the first measure of increasing the torque by injecting the fuel during the compression stroke to improve the anti-knock performance and increasing the advancing amount of the ignition timing, and the second measure of increasing the torque by injecting the fuel during the intake stroke to improve the intake air charging efficiency. Within the first engine speed range where the engine speed is relatively low and the retarding amount of the ignition timing is relatively large, adapting the first measure so that the black circle mark C1 becomes the star shaped mark A1 is more advantageous in increasing the torque compared to adapting the second measure in which the black circle mark C1 becomes the white circle mark B1. On the other hand, within the second engine speed range where the engine speed is relatively high and the retarding amount of the ignition timing is relatively small, adapting the second measure so that the black circle mark C2 becomes the star shaped mark B2 is more advantageous in increasing the torque compared to adapting the first measure in which the black circle mark C2 becomes the white circle mark A2. Based on such a point of view, the first predetermined value N1 defined by the first and second engine speed ranges may suitably be set, and here, the first predetermined value N1 is set to be 1,750 rpm, as an example.

As described above, because the ratio between the first injection amount and the second injection amount is 5:5 within the first engine speed range and 6:4 within the second engine speed range, the ratio of the first injection amount which is injected during the intake stroke with respect to the entire injection amount is set higher (6/10) for the second engine speed range where the engine speed is relatively high, compared to the ratio (5/10) for the first engine speed range where the engine speed is relatively low. This becomes advantageous in efficiently improving the mixing performance of the fuel and the intake air charging efficiency by using the intake flow that becomes stronger due to the high engine speed. Note that, especially within the second engine speed range, according to the increase of the engine speed, by changing the ratio between the first injection amount and the second injection amount, the ratio of the first injection amount with respect to the entire injection amount may be increased (it may gradually be increased starting from 6/10). This modified example can be advantageous in efficiently improving the mixing performance of the fuel and the intake air charging efficiency within the second engine speed range.

On the other hand, when the second injection is performed in the late stage of the intake stroke (the second engine speed range), the ratio of the second injection amount with respect to the entire injection amount is set to be lower than the ratio when the second injection is performed in the earlier-half stage of the compression stroke (the first engine speed range) (either one of 4/10 and 5/10). This is because, within the second engine speed range, setting the ratio of the second injection amount with respect to the entire injection amount to be comparatively low and increasing the ratio of the first injection amount to be injected in the middle stage of the intake stroke become advantageous in, as described above, improving the mixing performance of the fuel by the intake flow, and improving the intake air charging efficiency by cooling the intake air. On the other hand, within the first engine speed range, it is because setting the ratio of the second injection amount with respect to the entire injection amount comparatively high to set a priority in cooling the gas inside the cylinder 11 becomes advantageous in effectively increasing the torque through improving the anti-knock performance and through further advancing the ignition timing as much as possible.

The fuel injection timing shown in FIG. 6 is, as described above, a timing for the warmed-up state of the engine 1 and, during a cold state of the engine 1, it is hard for knocking to occur because the temperature inside the cylinder 11 is low. According to this, with the engine system of this embodiment, the engine controller 100 sets an altered injection timing based on the engine coolant temperature detected by the coolant temperature sensor 78, where the engine coolant temperature serves as one of parameters relating to the temperature of the engine 1. Specifically, according to the engine coolant temperature detected by the coolant temperature sensor 78, the engine controller 100 shifts the lines of SOI1, EOI1, SOI2 and EOI2 shown in FIG. 6 in a parallel manner upward in the cold state of the engine where the engine coolant temperature is below a predetermined value. That is, the injection timings of the first and second injections are advanced, respectively. Here, the shifting amount (advancing amount) may be set in proportion to the engine coolant temperature. Thereby, the injection timings of the first and second injections are set based on each of the lines of SOI1, EOI1, SOI2 and EOI2 which are shifted parallel-wise upward. As a result, although the timing of the second injection within the first engine speed range is set to be in the earlier-half stage of the compression stroke in FIG. 6, through advancing of the timing, it is shifted to the late stage of the intake stroke, as well as, although the timing of the first injection within the first engine speed range is set to be in the late stage of the intake stroke, through advancing of the timing, it is shifted to the middle stage of the intake stroke. Thus, in the cold state of the engine, the two divided injections, which are the first and second injections, are performed during the intake stroke even within the first engine speed range. Thereby, the mixing performance of the fuel improves and the intake air charging efficiency improves, therefore, the torque can be increased while avoiding knocking.

Then, as the warming up of the engine 1 proceeds, the injection timings of the first and second injections are set while moving the lines of SOI1, EOI1, SOI2 and EOI2 parallel-wise downward, and when the engine 1 reaches the warmed-up state ultimately, the injection timings of the first and second injections are set according to each of the lines of SOI1, EOI1, SOI2 and EOI2 as indicated in FIG. 6. As a result, when the state of the engine 1 is shifted from the cold state where the temperature of the engine 1 is below the predetermined value to the warmed-up state, within the first engine speed range, the injection timing of the first injection that is performed in the late stage of the intake stroke in the cold state is changed (retarded) so that the first injection is performed in the earlier-half stage of the compression stroke (and after the intake valve 21 is closed) in the warmed-up state. Thereby, both of avoiding knocking and increasing the torque can effectively be achieved according to the temperature state of the engine 1.

The engine controller 100 may perform control of setting the ignition timings of the first and second injections according to the temperature of the intake air in alternative to or in addition to the above described control based on the engine coolant temperature. The temperature of the intake air is also a parameter relating to the generation of knocking similar to the temperature of the engine 1. That is, based on the temperature of the intake air detected by the air flow sensor 71, when the temperature of the intake air is below a predetermined value, the engine controller 100 shifts the lines of SOI1, EOI1, SOI2 and EOI2 parallely upward by the shifting amount corresponding to the temperature. In this manner, the engine controller 100 sets the injection timings of the first and second injections, respectively. Thereby, similar to the above, the both of avoiding knocking and increasing the torque can effectively be achieved according to the temperature of the intake air.

Note that, instead of the injection timing of the fuel to be continuously changed according to the temperature of the engine 1 and/or the temperature of the intake air as described above, it may be changed in a step wise fashion according to the temperature of the engine 1 and/or the temperature of the intake air by changing the shifting amount of each line of SOI1, EOI1, SOI2 and EOI2 in FIG. 6 in a step wise fashion according to the temperature of the engine 1 and/or the temperature of the intake air.

Further, the dividing number of the fuel injections within the particular operating range is not limited to two and may suitably be set to be more than two. In this case, within the particular operating range, while the final injection timing of the divided injections may be set to be in the earlier-half stage of the compression stroke within the first engine speed range, the final injection timing of the divided injections may be set to be in the late stage of the intake stroke within the second engine speed range, and at least one of the injection timings that is other than the last injection may be set to be in the middle stage of the intake stroke. Thereby, the both of avoiding knocking and increasing the torque can effectively be achieved.

Further, the fuel injection within the operating range where the engine speed is higher than the particular operating range may be set to be the divided injections including two injections or above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

REFERENCE CHARACTER LIST

1 Spark-ignition Direct Injection Engine (Engine Body)
100 Engine Controller (Controller)
11 Cylinder
21 Intake Valve
22 Exhaust Valve
32 Variable Intake Valve Timing Mechanism (Compression Ratio Adjusting Mechanism)
51 Ignition Plug
53 Fuel Injection Valve
71 Air Flow Sensor
78 Coolant Temperature Sensor

The invention claimed is:

1. A method for controlling a spark-ignition direct injection engine, comprising:
  setting an effective compression ratio to be 10:1 or above, when an operating state of an engine body having a cylinder in which a geometric compression ratio is set to 12:1 or above is within a particular operating range where an engine speed is comparatively low and a load is high;
  retarding a spark ignition timing for a gas mixture inside the cylinder by a predetermined amount with respect to an MBT within the particular operating range, and setting a retarding amount of the spark ignition timing within a first engine speed range of the particular operating range, where the engine speed is relatively low, to be larger than a retarding amount of the spark ignition timing within a second engine speed range, where the engine speed is higher than the first engine speed range;
  setting an injection mode of a fuel injection valve for directly injecting fuel into the cylinder to divided injections in which the injection is performed at least twice in a period from an intake stroke to an earlier-half stage of a compression stroke within the particular operating range;
  performing a final injection of the divided injections in the earlier-half stage of the compression stroke, when the engine speed is within the first engine speed range of the particular operating range; and
  performing a final injection of the divided injections in a late stage of the intake stroke and at least one injection other than the final injection in a middle stage of the intake stroke, when the engine speed is within the second engine speed range of the particular operating range, wherein the middle stage of the intake stroke is a period within which an intake air flow velocity is the fastest, and is bordered by an early stage and a late stage of the intake stroke.

2. The method of claim 1, wherein when a temperature of the engine body is above a predetermined value, the final injection of the divided injections within the first engine speed range is performed in the earlier-half stage of the compression stroke, and when the temperature of the engine body is below the predetermined value, the final injection is performed in the late stage of the intake stroke.

3. The method of claim 1, further comprising, when the operating state of the engine body is within the particular operating range, setting a closing timing of an intake valve of the cylinder to be the earlier-half stage of the compression stroke;
wherein when a temperature of the engine body increases from below a predetermined value to above the predetermined value, a timing of the final injection within the first engine speed range is changed from the late stage of the intake stroke to after the intake valve is closed in the earlier-half stage of the compression stroke.

4. The method of claim 1, wherein when an intake air temperature of the engine body is above a predetermined value, the final injection within the first engine speed range is set to be in the earlier-half stage of the compression stroke, and when the intake air temperature is below the predetermined value, the final injection is performed in the late stage of the intake stroke.

5. The method of claim 1, wherein when the operating state of the engine body is within the first engine speed range, the injection mode of the fuel injection valve is set to the divided injections in which two injections, which include a first injection that is performed on the intake stroke and a second injection that is performed in the earlier-half stage of the compression stroke, are performed, when the operating state of the engine body is within the second engine speed range, the injection mode of the fuel injection valve is set to the divided injections in which two injections, which include a first injection that is performed in the middle stage of the intake stroke and a second injection that is performed in the late stage of the intake stroke, are performed, and when the engine speed is relatively high, a ratio of a first injection amount with respect to a total injection amount is set higher than when the engine speed is relatively low.

6. The method of claim 1, wherein when the operating state of the engine body is within the particular operating range, the injection mode of the fuel injection valve is set to the divided injections in which two injections, which include a first injection and a second injection, are performed, the first injection is performed on the intake stroke when the second injection is performed in the earlier-half stage of the compression stroke, and is performed in the middle stage of the intake stroke when the second injection is performed in the late stage of the intake stroke, and when a timing of the second injection is set to be in the late stage of the intake stroke, a ratio of a second injection amount with respect to a total injection amount is set lower than when the ignition timing of the second injection is set to be in the earlier-half stage of the compression stroke.

7. The method of claim 1, wherein the ignition timing is set to be during an expansion stroke after a top dead center on the compression stroke for the first engine speed range, and is set to be during the compression stroke before the top dead center on the compression stroke for the second engine speed range.

8. The method of claim 1, further comprising setting a pressure of the fuel to be supplied to the fuel injection valve higher as the engine speed increases.

9. A control device of a spark-ignition direct injection engine, comprising:
an engine body having a cylinder in which a geometric compression ratio is set to 12:1 or above;
a fuel injection valve for directly injecting fuel into the cylinder at a predetermined injection timing;
an ignition plug for spark-igniting a gas mixture inside the cylinder at a predetermined ignition timing;
a compression ratio adjusting mechanism for adjusting an effective compression ratio of the engine body by changing activation modes of intake and exhaust valves for performing intake and exhaust for the cylinder, the activation modes including at least opening and closing timings of the intake and exhaust valves; and
a controller for controlling an operation of the engine body through controlling the fuel injection valve, the ignition plug, and the compression ratio adjusting mechanism;
wherein, when an operating state of the engine body is within a particular operating range where an engine speed is comparatively low and a load is high, the control by the controller includes:
setting the effective compression ratio to be 10:1 or above;
retarding a spark ignition timing with respect to an MBT, and setting a retarding amount of the spark ignition timing within a first engine speed range of the particular operating range, where the engine speed is relatively low, to be larger than a retarding amount of the spark ignition timing within a second engine speed range, where the engine speed is higher than the first engine speed range;
setting an injection mode of the fuel to divided injections in which the injection is performed at least twice in a period from an intake stroke to an earlier-half stage of a compression stroke;
performing, within the first engine speed range, a final injection of the divided injections in the earlier-half stage of the compression stroke; and
performing, within the second engine speed range, the final injection of the divided injections in a late stage of the intake stroke and the at least one injection other than the final injection in a middle stage of the intake stroke.

10. The control device of claim 9, further comprising a first detector for detecting a temperature parameter relating to a temperature of the engine body;
wherein based on a detection result by the first detector, the controller sets a final injection timing of the divided injections within the first engine speed range to be in the earlier-half stage of the compression stroke when the temperature of the engine body is above a predetermined value and to be in the late stage of the intake stroke when the temperature of the engine body is below the predetermined value.

11. The control device of claim 9, wherein the controller sets, when the operating state of the engine body is within the particular operating range, the closing timing of the intake valve to be the earlier-half stage of the compression stroke, and
wherein the controller further changes, when a temperature of the engine body increases from below a predetermined value to above the predetermined value, the timing of the final injection within the first engine speed range from the late stage of the intake stroke to after the intake valve is closed in the earlier-half stage of the compression stroke.

12. The control device of claim 9, further comprising a second detector for detecting an intake air temperature of the engine body;

wherein based on a detection result by the second detector for detecting the intake air temperature of the engine body, the controller sets the final injection within the first engine speed range to be in the earlier-half stage of the compression stroke when the intake air temperature of the engine body is above a predetermined value, and sets the final injection to be in the late stage of the intake stroke when the intake air temperature is below the predetermined value.

13. The control device of claim 9, wherein when the operating state of the engine body is within the first engine speed range, the controller sets the injection mode of the fuel injection valve to the divided injections in which two injections, which include a first injection that is performed on the intake stroke and a second injection that is performed in the earlier-half stage of the compression stroke, are performed, when the operating state of the engine body is within the second engine speed range, the controller sets the injection mode of the fuel injection valve to the divided injections in which two injections, which include a first injection that is performed in the middle stage of the intake stroke and a second injection that is performed in the late stage of the intake stroke, are performed, and when the engine speed is relatively high, the controller sets a ratio of a first injection amount with respect to a total injection amount higher than when the engine speed is relatively low.

14. The control device of claim 9, wherein when the operating state of the engine body is within the particular operating range, the controller sets the injection mode of the fuel injection valve to the divided injections in which two injections, which include a first injection and a second injection, are performed, performs the first injection on the intake stroke when the second injection is performed in the earlier-half stage of the compression stroke, and performs the first injection in the middle stage of the intake stroke when the second injection is performed in the late stage of the intake stroke, and wherein when the timing of the second injection is set to be in the late stage of the intake stroke, the controller sets a ratio of a second injection amount with respect to a total injection amount lower than when the ignition timing of the second injection is set to be in the earlier-half stage of the compression stroke.

15. The control device of claim 9, wherein the controller sets the ignition timing to be during an expansion stroke after a top dead center of the compression stroke for the first engine speed range, and during the compression stroke before the top dead center of the compression stroke for the second engine speed range.

16. The control device of claim 9, wherein a pressure of the fuel to be supplied to the fuel injection valve is increased as the engine speed increases.

17. The control device of claim 9, wherein when the engine body is at least within the particular operating range, a tumble ratio of inside the cylinder is 1.5:1 or above.

* * * * *